(12) United States Patent
Kuik et al.

(10) Patent No.: US 7,437,477 B2
(45) Date of Patent: *Oct. 14, 2008

(54) SCSI-BASED STORAGE AREA NETWORK HAVING A SCSI ROUTER THAT ROUTES TRAFFIC BETWEEN SCSI AND IP NETWORKS

(75) Inventors: Timothy J. Kuik, Lino Lakes, MN (US); David Patrick Thompson, Rogers, MN (US); Mark A. Bakke, Maple Grove, MN (US); Clayton Stuart Haapala, Minnetonka, MN (US); Stephen P. De Groote, Maple Grove, MN (US); Craig A. Johnson, Maple Grove, MN (US); James D. Muchow, Zimmerman, MN (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/622,436

(22) Filed: Jan. 11, 2007

(65) Prior Publication Data

US 2007/0112931 A1 May 17, 2007

Related U.S. Application Data

(63) Continuation of application No. 10/128,656, filed on Apr. 22, 2002, now Pat. No. 7,165,258.

(51) Int. Cl.
*G06F 15/173* (2006.01)

(52) U.S. Cl. .................. 709/238; 719/326; 719/327

(58) Field of Classification Search ............... 719/326, 719/327; 710/11, 62, 72, 305; 370/466, 370/467; 709/238, 250
See application file for complete search history.

(56) References Cited

U.S. PATENT DOCUMENTS

| | | | |
|---|---|---|---|
| 4,495,617 A | 1/1985 | Ampulski et al. |
| 5,390,326 A | 2/1995 | Shah |
| 5,461,608 A | 10/1995 | Yoshiyama |
| 5,473,599 A | 12/1995 | Li et al. |
| 5,535,395 A | 7/1996 | Tipley et al. |
| 5,544,077 A | 8/1996 | Hershey |
| 5,579,491 A | 11/1996 | Jeffries et al. |

(Continued)

OTHER PUBLICATIONS

*VMware ESX Server: User's Manual*, Version 1.0, obtained from http://web.archive.org/web/20010608201203/www.vmware.com/support, (Jun. 6, 2001), 122-124.

(Continued)

*Primary Examiner*—Krisna Lim
(74) *Attorney, Agent, or Firm*—Schwegman, Lundberg & Woessner, P.A.

(57) ABSTRACT

A system and method for accessing Storage Area Networks over an IP network. A SCSI request is generated and encapsulated in one or more IP packets. The encapsulated SCSI request is routed over an IP network and received by a storage router. The storage router extracts the SCSI request from the one or more IP packets and routes the extracted SCSI request through a virtual SCSI router to the storage area network.

20 Claims, 11 Drawing Sheets

U.S. PATENT DOCUMENTS

| | | |
|---|---|---|
| 5,600,828 A | 2/1997 | Johnson et al. |
| 5,666,486 A | 9/1997 | Alfieri et al. |
| 5,684,957 A | 11/1997 | Kondo et al. |
| 5,732,206 A | 3/1998 | Mendel |
| 5,812,821 A | 9/1998 | Sugi et al. |
| 5,870,571 A | 2/1999 | Duburcq et al. |
| 5,909,544 A | 6/1999 | Anderson et al. |
| 5,951,683 A | 9/1999 | Yuuki et al. |
| 5,991,813 A | 11/1999 | Zarrow |
| 5,996,024 A | 11/1999 | Blumenau |
| 5,996,027 A | 11/1999 | Volk et al. |
| 6,006,224 A | 12/1999 | McComb et al. |
| 6,006,259 A | 12/1999 | Adelman et al. |
| 6,009,476 A | 12/1999 | Flory et al. |
| 6,018,765 A | 1/2000 | Durana et al. |
| 6,041,381 A | 3/2000 | Hoese |
| 6,078,957 A | 6/2000 | Adelman et al. |
| 6,108,300 A | 8/2000 | Coile et al. |
| 6,108,699 A | 8/2000 | Moiin |
| 6,131,119 A | 10/2000 | Fukui |
| 6,134,673 A | 10/2000 | Chrabaszcz |
| 6,145,019 A | 11/2000 | Firooz et al. |
| 6,151,684 A | 11/2000 | Alexander et al. |
| 6,163,855 A | 12/2000 | Shrivastava et al. |
| 6,178,445 B1 | 1/2001 | Dawkins et al. |
| 6,185,620 B1 | 2/2001 | Weber et al. |
| 6,195,687 B1 | 2/2001 | Greaves et al. |
| 6,195,760 B1 | 2/2001 | Chung et al. |
| 6,209,023 B1 | 3/2001 | Dimitroff et al. |
| 6,219,771 B1 | 4/2001 | Kikuchi et al. |
| 6,260,158 B1 | 7/2001 | Purcell et al. |
| 6,268,924 B1 | 7/2001 | Koppolu et al. |
| 6,269,396 B1 | 7/2001 | Shah et al. |
| 6,314,526 B1 | 11/2001 | Arendt et al. |
| 6,327,622 B1 | 12/2001 | Jindal et al. |
| 6,343,320 B1 | 1/2002 | Fairchild et al. |
| 6,363,416 B1 | 3/2002 | Naeimi et al. |
| 6,378,025 B1 | 4/2002 | Getty |
| 6,393,583 B1 | 5/2002 | Meth et al. |
| 6,400,730 B1 | 6/2002 | Latif et al. |
| 6,449,652 B1 | 9/2002 | Blumenau et al. |
| 6,470,382 B1 | 10/2002 | Wang et al. |
| 6,470,397 B1 | 10/2002 | Shah et al. |
| 6,473,803 B1 | 10/2002 | Stern et al. |
| 6,480,901 B1 | 11/2002 | Weber et al. |
| 6,484,245 B1 | 11/2002 | Sanada et al. |
| 6,574,755 B1 | 6/2003 | Seon |
| 6,591,310 B1 | 7/2003 | Johnson |
| 6,597,956 B1 | 7/2003 | Aziz et al. |
| 6,606,690 B2 | 8/2003 | Padovano |
| 6,640,278 B1 | 10/2003 | Nolan et al. |
| 6,654,830 B1 | 11/2003 | Taylor et al. |
| 6,658,459 B1 | 12/2003 | Kwan et al. |
| 6,678,721 B1 | 1/2004 | Bell |
| 6,683,883 B1 | 1/2004 | Czeiger et al. |
| 6,691,244 B1 | 2/2004 | Kampe et al. |
| 6,697,924 B2 | 2/2004 | Swank |
| 6,701,449 B1 | 3/2004 | Davis et al. |
| 6,718,361 B1 | 4/2004 | Basani et al. |
| 6,721,907 B2 | 4/2004 | Earl |
| 6,724,757 B1 | 4/2004 | Zadikian et al. |
| 6,732,170 B2 | 5/2004 | Miyake et al. |
| 6,748,550 B2 | 6/2004 | McBrearty et al. |
| 6,757,291 B1 | 6/2004 | Hu |
| 6,760,783 B1 | 7/2004 | Berry |
| 6,763,195 B1 | 7/2004 | Willebrand et al. |
| 6,763,419 B2 | 7/2004 | Hoese et al. |
| 6,771,663 B1 | 8/2004 | Jha |
| 6,771,673 B1 | 8/2004 | Baum et al. |
| 6,779,016 B1 | 8/2004 | Aziz et al. |
| 6,785,742 B1 | 8/2004 | Teow et al. |
| 6,799,316 B1 | 9/2004 | Aguilar et al. |
| 6,807,581 B1 | 10/2004 | Starr et al. |
| 6,823,418 B2 | 11/2004 | Langendorf et al. |
| 6,839,752 B1 | 1/2005 | Miller et al. |
| 6,848,007 B1 | 1/2005 | Reynolds et al. |
| 6,856,591 B1 | 2/2005 | Ma et al. |
| 6,859,462 B1 | 2/2005 | Mahoney et al. |
| 6,877,044 B2 | 4/2005 | Lo et al. |
| 6,886,171 B2 | 4/2005 | MacLeod |
| 6,895,461 B1 | 5/2005 | Thompson |
| 6,920,491 B2 | 7/2005 | Kim |
| 6,938,092 B2 | 8/2005 | Burns |
| 6,941,340 B2 | 9/2005 | Kim et al. |
| 6,944,785 B2 | 9/2005 | Gadir et al. |
| 6,977,927 B1 | 12/2005 | Bates et al. |
| 6,985,490 B2 | 1/2006 | Czeiger et al. |
| 7,020,696 B1 | 3/2006 | Perry et al. |
| 7,043,727 B2 | 5/2006 | Bennett et al. |
| 7,107,395 B1 | 9/2006 | Ofek et al. |
| 7,139,811 B2 | 11/2006 | Lev Ran et al. |
| 7,146,233 B2 | 12/2006 | Aziz et al. |
| 7,171,453 B2 | 1/2007 | Iwami |
| 7,185,062 B2 | 2/2007 | Lolayekar et al. |
| 7,197,561 B1 | 3/2007 | Lovy et al. |
| 7,203,746 B1 | 4/2007 | Harrop |
| 7,231,430 B2 | 6/2007 | Brownell et al. |
| 7,281,062 B1 | 10/2007 | Kuik et al. |
| 7,353,259 B1 | 4/2008 | Bakke et al. |
| 2002/0010750 A1 | 1/2002 | Baretzki |
| 2002/0042693 A1 | 4/2002 | Kampe et al. |
| 2002/0049845 A1 | 4/2002 | Sreenivasan et al. |
| 2002/0055978 A1 | 5/2002 | Joon-Bo et al. |
| 2002/0059392 A1 | 5/2002 | Ellis |
| 2002/0065864 A1 | 5/2002 | Hartsell et al. |
| 2002/0065872 A1 | 5/2002 | Genske et al. |
| 2002/0103889 A1 | 8/2002 | Markson et al. |
| 2002/0103943 A1 | 8/2002 | Lo et al. |
| 2002/0116460 A1 | 8/2002 | Treister et al. |
| 2002/0126680 A1 | 9/2002 | Inagaki et al. |
| 2002/0156612 A1 | 10/2002 | Schulter et al. |
| 2002/0188657 A1 | 12/2002 | Traversat et al. |
| 2002/0188711 A1 | 12/2002 | Meyer et al. |
| 2002/0194428 A1 | 12/2002 | Green |
| 2003/0005068 A1 | 1/2003 | Nickel et al. |
| 2003/0014462 A1 | 1/2003 | Bennett et al. |
| 2003/0018813 A1 | 1/2003 | Antes et al. |
| 2003/0018927 A1 | 1/2003 | Gadir et al. |
| 2003/0058870 A1 | 3/2003 | Mizrachi et al. |
| 2003/0084209 A1 | 5/2003 | Chadalapaka |
| 2003/0097607 A1 | 5/2003 | Bessire |
| 2003/0145074 A1 | 7/2003 | Penick |
| 2003/0145116 A1 | 7/2003 | Moroney et al. |
| 2003/0182422 A1 | 9/2003 | Bradshaw et al. |
| 2003/0182455 A1 | 9/2003 | Hetzler et al. |
| 2003/0204580 A1 | 10/2003 | Baldwin et al. |
| 2003/0208579 A1 | 11/2003 | Brady et al. |
| 2003/0210686 A1 | 11/2003 | Terrell et al. |
| 2003/0212898 A1 | 11/2003 | Steele et al. |
| 2003/0229690 A1 | 12/2003 | Kitani et al. |
| 2004/0010545 A1 | 1/2004 | Pandya |
| 2004/0024778 A1 | 2/2004 | Cheo |
| 2004/0030766 A1 | 2/2004 | Witkowski |
| 2004/0064553 A1 | 4/2004 | Kjellberg |
| 2004/0141468 A1 | 7/2004 | Christensen |
| 2004/0233910 A1 | 11/2004 | Chen et al. |
| 2005/0055418 A1 | 3/2005 | Blanc et al. |
| 2005/0063313 A1 | 3/2005 | Nanavati et al. |
| 2005/0268151 A1 | 12/2005 | Hunt et al. |

OTHER PUBLICATIONS

Bakker, G., *IP Aliasing*, obtained from http://www.zone-h.org/files/24/ip_aliasing.txt,(1999), 3 pgs.

Gusella, R., et al., "An Election Algorithm for a Distributed Clock Synchronization Program", Report No. UCB/CSD 86/257, University of California, Berkeley, (Dec. 1985), 1-17.

Gusella, R., et al., "The Berkeley UNIX Time Synchronization Protocol", *UNIX Programmers Manual 4.3*, vol. 2C, Berkeley Software Distrib., (1986), 10 pgs.

Knight, S., et al., *Virtual Router Redundancy Protocol*, Network Working Group, RFC 2338, obtained from http://www.search.ietf.org/rfc/rfc2338.txt, (1998), 26 pgs.

Lewis, P., "A High-Availability Cluster for Linux", *Linux Journal*, 64, obtained from http://www2.linuxjournal.com/lj-issues/issue64/3247.html, (Apr. 1994), 11 pgs.

Li, T., et al., *Cisco Hot Standby Router Protocol (HSRP)*, Network Working Group, RFC 2281, obtained from http://www.search.ietf.org/rfc/rfc2281.txt, (1998), 16 pgs.

Meth, K. Z., et al., "Design of the iSCSI Protocol", *Proceedings of the 20th IEEE Conference on Mass Storage Systems and Technologies*, (Apr. 7-10, 2003), 116-122.

Moore, K., *On the Use of HTTP as a Substrate*, Network Working Group, RFC 3205, obtained from http://www.search.letf.org/rfc/rfc3205.txt, (2002), 14 pgs.

Satran, J., et al., *iSCSI*, IPS Internet Draft, draft-ietf-ips-iSCSI-12.txt, Category: standards—track, (Apr. 17, 2002), 260 pgs.

Satran, J., et al., *iSCSI*, IPS Internet Draft, draft-ietf-ips-iSCSI-00, Category: Standards Track, obtained from http://www.haifa.il.ilb.com/satran/ips/draft-ietf-ips-iSCSI-00.txt,(Nov. 2000), 78 pgs.

Simitci, H., et al., "Evaluation of SCSP Over TCP/IP and SCSI Over Fibre Channel Connections", *Hot Interconnects*, 9, (Aug. 2001), 87-91.

U.S. Appl. No. 10/128,656 final office action mailed May 19, 2006, 7 p.

U.S. Appl. No. 10/128,656 non-final office action mailed Sep. 23, 2005, 6 p.

U.S. Appl. No. 10/128,656 notice of allowance mailed Aug. 10, 2006, 2 p.

U.S. Appl. No. 10/128,656 response filed Jul. 19, 2006 to final office action mailed May 19, 2006, 8 p.

U.S. Appl. No. 10/128,656 response filed Feb. 23, 2006 to non-final office action mailed Sep. 23, 2005, 12 p.

U.S. Appl. No. 10/128,657, Notice of Allowance mailed Nov. 2, 2007, NOAR,2 pgs.

SCSI-BASED STORAGE AREA NETWORK HAVING A SCSI ROUTER THAT ROUTES TRAFFIC BETWEEN SCSI AND IP NETWORKS

CROSS-REFERENCE TO RELATED APPLICATIONS

This application is a continuation of U.S. application Ser. No. 10/128,656, filed Apr. 22, 2002, now U.S. Pat. No. 7,165,258, issued on Jan. 16, 2007, entitled "SCSI-BASED STORAGE AREA NETWORK HAVING A SCSI ROUTER THAT ROUTES TRAFFIC BETWEEN SCSI AND IP NETWORKS", which is related to the following co-pending, commonly assigned U.S. patent applications:

Application Ser. No. 10/122401, filed Apr. 11, 2002, entitled "METHOD AND APPARATUS FOR SUPPORTING COMMUNICATIONS BETWEEN NODES OPERATING IN A MASTER-SLAVE CONFIGURATION", which is a continuation of application Ser. No. 09/949,182, filed Sep. 7, 2001, entitled "METHOD AND APPARATUS FOR SUPPORTING COMMUNICATIONS BETWEEN NODES OPERATING IN A MASTER-SLAVE CONFIGURATION"; application Ser. No. 10/094,552, filed Mar. 7, 2002, entitled "METHOD AND APPARATUS FOR EXCHANGING HEARTBEAT MESSAGES AND CONFIGURATION INFORMATION BETWEEN NODES OPERATING IN A MASTER-SLAVE CONFIGURATION"; application Ser. No. 10/131,275, filed even date herewith, entitled "METHOD AND APPARATUS FOR CONFIGURING NODES AS MASTERS OR SLAVES"; application Ser. No. 10/131,274, filed even date herewith, entitled "METHOD AND APPARATUS FOR TERMINATING APPLICATIONS N A HIGH-AVAILABILITY NETWORK"; application Ser. No. 10/131,793, filed even date herewith, entitled "VIRTUAL SCSI BUS FOR SCSI-BASED STORAGE AREA NETWORK"; application Ser. No. 10/131,782, filed even date herewith, entitled "VIRTUAL MAC ADDRESS SYSTEM AND METHOD"; application Ser. No. 10/128,655, filed even date herewith, entitled "SYSTEM AND METHOD FOR CONFIGURING FIBRE-CHANNEL DEVICES"; application Ser. No. 10/131,789, filed even date herewith, now U.S. Pat. No. 6,895,461, issued on May 17, 2005, entitled "METHOD AND APPARATUS FOR ASSOCIATING AN IP ADDRESS AND INTERFACE TO A SCSI ROUTING INSTANCE"; application Ser. No. 10/128,657, filed even date herewith, entitled "METHOD AND APPARATUS FOR EXCHANGING CONFIGURATION INFORMATION BETWEEN NODES OPERATING IN A MASTER-SLAVE CONFIGURATION"; and application Ser. No. 10/128,993, filed even date herewith, now U.S. Pat. No. 7,188,194, issued on Mar. 6, 2007, entitled "SESSION-BASED TARGET/LUN MAPPING FOR A STORAGE AREA NETWORK AND ASSOCIATED METHOD", all of the above of which are hereby incorporated by reference in their entirety.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the drawings, the software descriptions/examples, and data as described below: Copyright © 2001-2002, Cisco Systems, Inc., All Rights Reserved.

FIELD OF THE INVENTION

This invention relates generally to data storage, and more particularly to a system and method for making SCSI-based devices accessible across a network.

BACKGROUND OF THE INVENTION

As electronic business (ebusiness) grows, so does the need for better ways to share and manage large amounts of data. The amount of data storage required by today's ebusinesses is staggering. A good example of this is mail.com, which grew to 60 terabytes of storage in just 45 days.

Today almost all client access to large scale storage is accomplished by sending requests through general-purpose servers that connect an IP network (e.g., LAN or WAN) to the storage network (e.g., a Storage Area Networks (SAN)). Storage Area Networks provide access to large amounts of data storage.

SANs, however, are complex systems. A recent Enterprise Management Associates (EMA) study of 187 IT professionals stated, however, that only 20% of customers had installed SANs by the end of 1999. 46% of the respondents in that survey said they had no plans to install a SAN. The top four reasons for delaying or for deciding not to install a SAN were: high implementation costs, lack of qualified staff, technology immaturity, and lack of standards. Furthermore, although SANs typically are very good at connecting native storage resources, they are distance-limited and have no knowledge of IP and its priorities.

Often, customers outsource their storage to a SSP provider who will manage their storage needs for a predetermined fee. A typical application would use a distributed Fibre-Channel (FC) network to connect an IP network to FC devices located at either a local or a remote site. In this example, the S SP provides the entire storage infrastructure on the customers premises. While FC has numerous advantages, it lacks network management tools and is significantly higher priced than comparable Ethernet products. Most importantly, due to lack of network security, the SSP must create a separate Storage Area Network for each customer at the SSP to separate data from multiple customers.

For the reasons stated above, and for other reasons stated below which will become apparent to those skilled in the art upon reading and understanding the present specification, there is a need in the art for a system and method for accessing SANs over an IP network in a more integrated fashion.

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise, terms such as "processing" or "computing" or "calculating" or "determining" or "displaying" or the like, refer to the actions and processes of a computer system, or similar computing device, to manipulate and transform data. Unless specifically stated otherwise, the data being manipulated is stored as physical (e.g., electronic) representations within computer system registers and memories, or within other information storage, transmission or display devices. The following detailed description is, therefore, not to be taken in a limiting sense, and the scope of the present invention is defined only by the appended claims.

Figure 1:
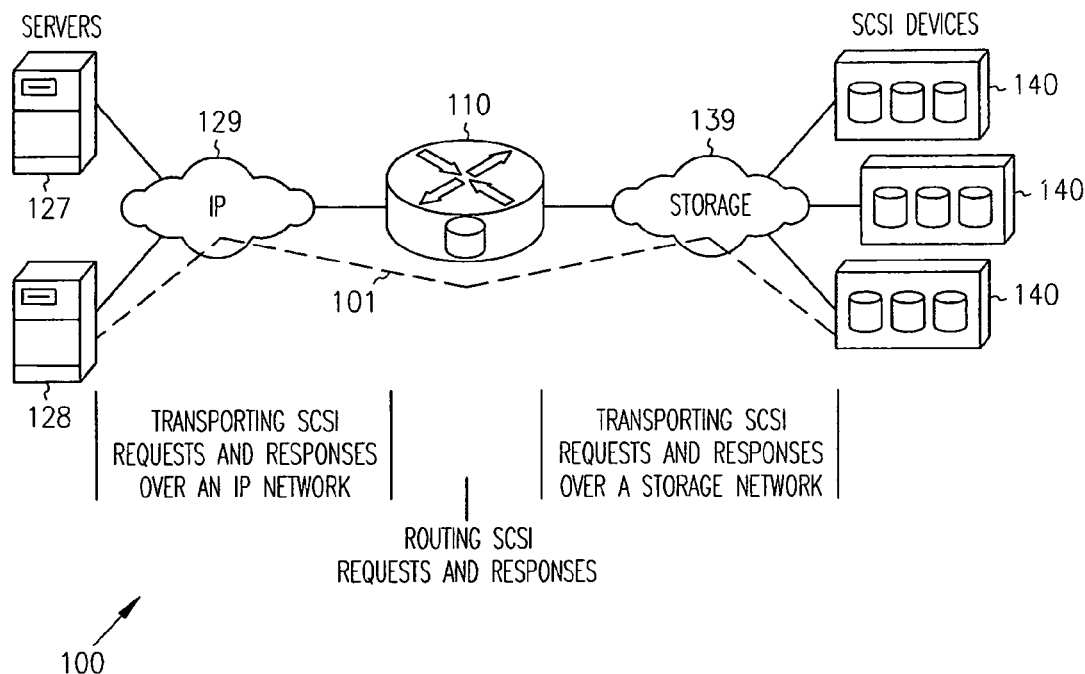
FIG. 1 is a block diagram of a SCSI-based storage system according to the present invention.

A SCSI-based storage system is shown in FIG. 1. The Small Computer Systems Interface (SCSI) is a popular family of protocols for communicating with I/O devices, especially storage devices. In system 100 of FIG. 1, one or more servers 127, 128 access a storage network 139 via an IP network 129. A server issues a SCSI request and encapsulates the SCSI request in one or more IP packets. The encapsulated SCSI request is routed across IP network 129 to a storage router 110, where the SCSI request is extracted from the one or more IP packets. The extracted SCSI request is then routed through storage network 139 to a storage device 140. The server, therefore, can access storage device 140 as if it were directly attached to the storage device.

As is shown in FIG. 1, in one embodiment, system 100 can be viewed as performing three distinct actions for each request 101. First, SCSI requests are transported over an IP network. Second, SCSI requests are routed through storage router 110 to storage network 139. Finally, the SCSI request is transported across storage network 139 to a SCSI device 140.

Similarly, as is shown in the embodiment in FIG. 1, system 100 can be viewed as performing three distinct actions for each response. First, SCSI responses are transported from SCSI device 140 across storage network 139. Second, SCSI responses are routed through storage router 110 to IP network 129. Finally, the SCSI response is transported across IP network 129 to one of the servers 127, 128.

Figure 9:
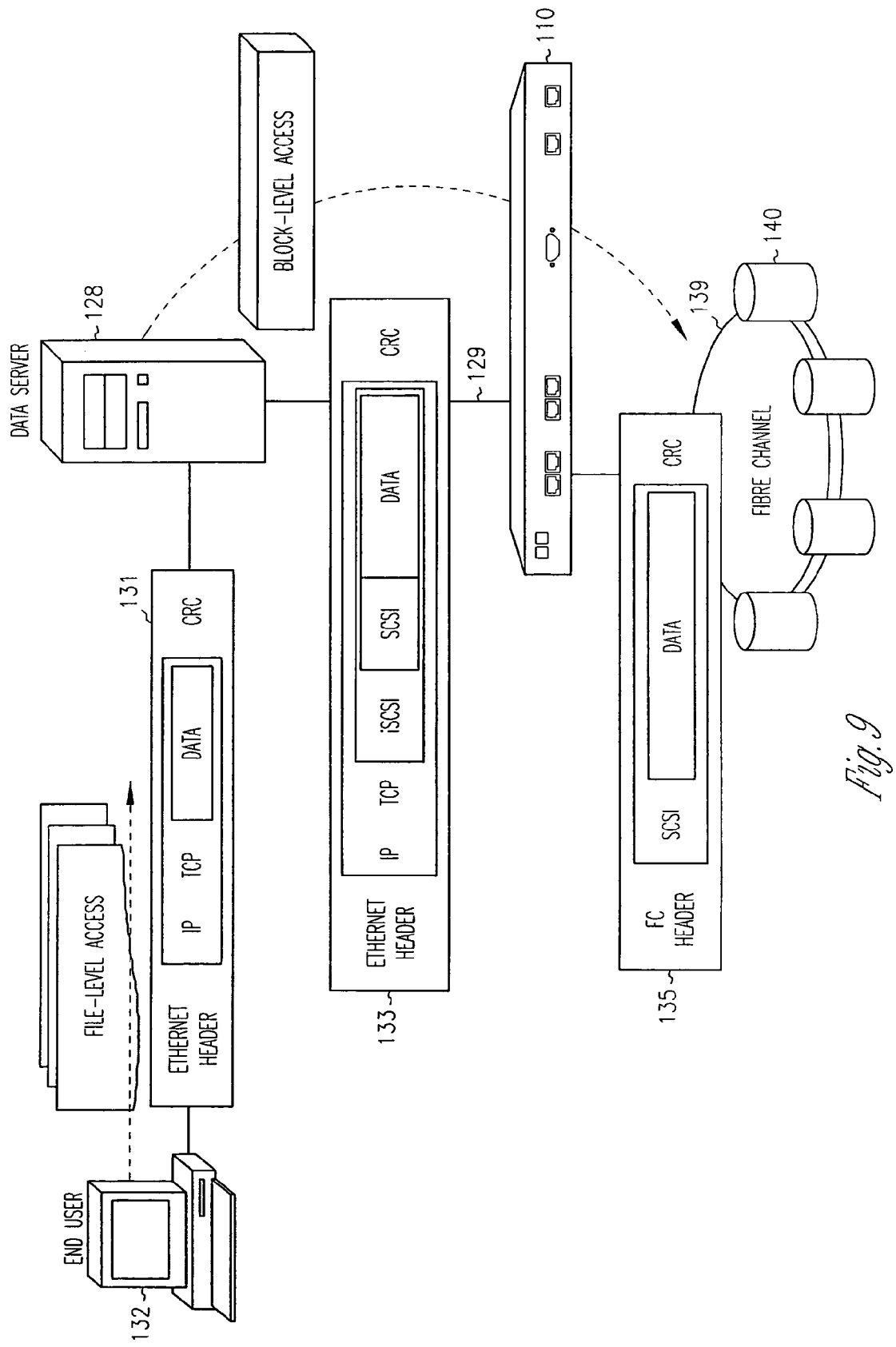
FIG. 9 is a block diagram of a SAN 100 showing SCSI encapsulation.

In one embodiment, a driver in each server 127, 128 is used to encapsulate SCSI commands into one or more IP packets. Such an embodiment is shown in FIG. 9. In the embodiment shown in FIG. 9, the driver implements the iSCSI specification. The iSCSI protocol is a transport protocol for SCSI that operates on top of TCP. It is described in "draft-ietf-ips-iSCSI-12.txt" on the Internet Engineering Task Force web site.

The iSCSI protocol aims to be fully compliant with the requirements laid out in the SCSI Architecture Model-2 (SAM2) document. The iSCSI protocol is a mapping of the SCSI remote procedure invocation model (see the SAM document) over the TCP protocol. SCSI commands are carried by iSCSI requests and SCSI responses and status are carried by iSCSI responses. iSCSI also uses the request response mechanism for iSCSI protocol mechanisms.

Returning to FIG. 9, an end user initiates a request for data from computer 132. Computer 132 sends the request via one or more IP packets 131 to server 128. Server 128 creates one or more SCSI block requests based on the file request received from computer 132, encapsulates the SCSI block requests within IP packets 133 and sends the encapsulated packets 133 across IP network 129 to storage router 110. Storage router 110 extracts the SCSI block requests and sends the requests across storage network 139 to storage device 140. In the embodiment shown, storage network 139 is a Fibre-Channel (FC) network and the SCSI block requests are sent across storage network 139 as Fibre-Channel packets 135.

Figure 2:
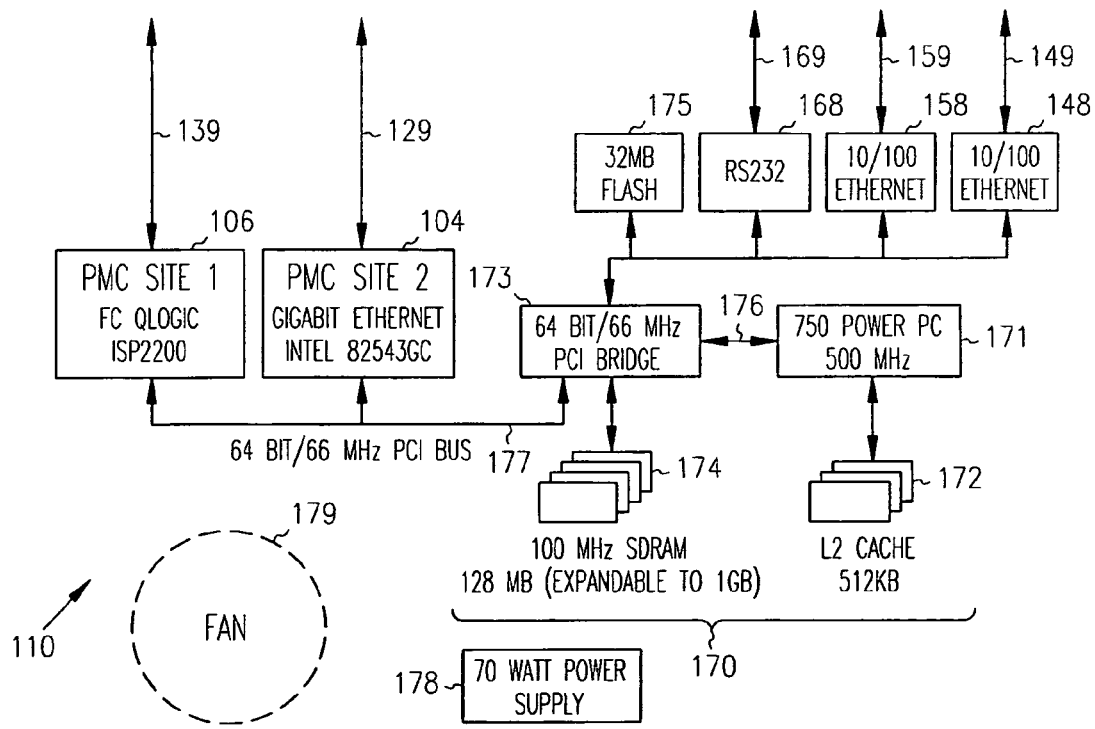
FIG. 2 shows a hardware block diagram of one embodiment of storage router 110.

One embodiment of storage router 110 is shown in FIG. 2. Storage router 110 of FIG. 2 includes a processor 170, which runs the storage router 110 software, a Gigabit Ethernet interface 106, which provides connection to IP network 129 for access by servers 127, 128 and a Fibre Channel interface 104, which provides connection to storage network 139 for access to storage devices 140.

In the embodiment shown in FIG. 2, storage router 110 also includes a High Availability (HA) interface 148, which provides a physical connection for high availability communication with another storage router 110 and management interfaces 158 and 168, which provide connections for managing storage router 110. As shown in FIG. 2, HA interface 148 includes a 10/100 Ethernet interface. HA interface 148 will be described in more detail below.

In the embodiment shown in FIG. 2, the management interfaces include an RS-232 interface 168 for local console connection and a 10/100 Ethernet interface 158 for local or network connection.

In one such embodiment, processor 170 is implemented as a 750PowerPC microprocessor 171 running at 500 MHz and having 512 KB of local L2 cache 172. Microprocessor 171 connects through bus 176 to a 64-bit, 66-MHz PCI bridge 173 that controls 128 MB to 1 GB of SDRAM 174. Bridge 173 also controls interfaces 148, 158 and 168 and a PCI bus 177.

In the embodiment shown in FIG. 2, router 110 is implemented in a 1 U rack-mountable chassis (not shown). The chassis is powered by a 70 watt power supply 178 and cooled by fan 179. In one such embodiment, interface 104 to IP network 129 is a Gigabit Ethernet card using Intel 82543GC-type hardware at a first PCI interface site. Interface 106 is a Fibre-Channel card using Qlogic ISP2200-type hardware at a second PCI interface site (for a Fibre-Channel interface). In another embodiment, interface 106 is a parallel SCSI card using Qlogic 1100-type hardware at a second PCI interface site (for a parallel SCSI interface).

In one embodiment, a 32 MB FLASH-type non-volatile storage 175 is provided to store the software that is loaded into processor 170.

The storage router 110 software provides SCSI routing between servers and the storage devices. In one embodiment, the software includes a command line interface (CLI) and web-based graphical user interface (GUI) for operation, configuration and administration, maintenance, and support tasks of storage router 110 from a terminal connected to one or both of the management ports 158 and/or 168.

Figure 3:
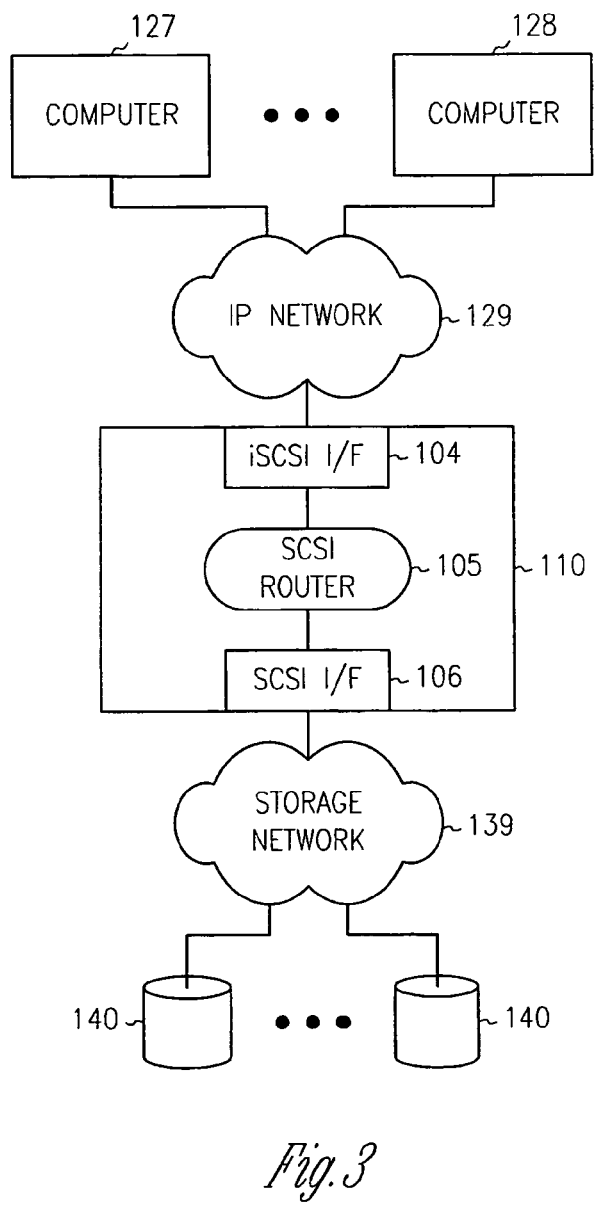
FIG. 3 is a function block diagram of an exemplary system 100 having storage router 110.

Another embodiment of a SCSI-based storage system 100 is shown in FIG. 3. In the system shown in FIG. 3, system 100 includes computers (127, 128) connected through an IP network 139 to storage router 110. Storage router 110 is connected in turn through storage network 130 to one or more SCSI devices 140. In the embodiment shown in FIG. 3, storage router 110 includes an iSCSI interface 104, a SCSI router 105 and a SCSI interface 106. iSCSI interface 104 receives encapsulated SCSI packets from IP network 129, extracts the SCSI packet and send the SCSI packet to SCSI router 105. SCSI interface 106 modifies the SCSI packet to conform with its network protocol (e.g., Fibre Channel, parallel SCSI, or iSCSI) and places the modified SCSI packet onto storage network 130. The SCSI packet is then delivered to its designated SCSI device 140.

In one embodiment, computers 127-128 formulate storage commands as if to their own iSCSI devices (with target and LUN addresses (or names)). The commands are placed in IP packets that are passed over IP network 129 (for example, a GbE network) and are received by iSCSI interface 104 which strips off TCP/IP headers. SCSI router 105 then maps the logical iSCSI targets or target/LUN combinations to SCSI addresses used on storage network 139. Interface 106, which in some embodiments is a Fiber Channel interface, and in other embodiments is a parallel SCSI interface (or even another iSCSI interface), then packages the commands and/or data (for example, adding FCP headers and FC headers for information going to an FC network 139) and sends it to one of the storage devices 140.

Figure 10:
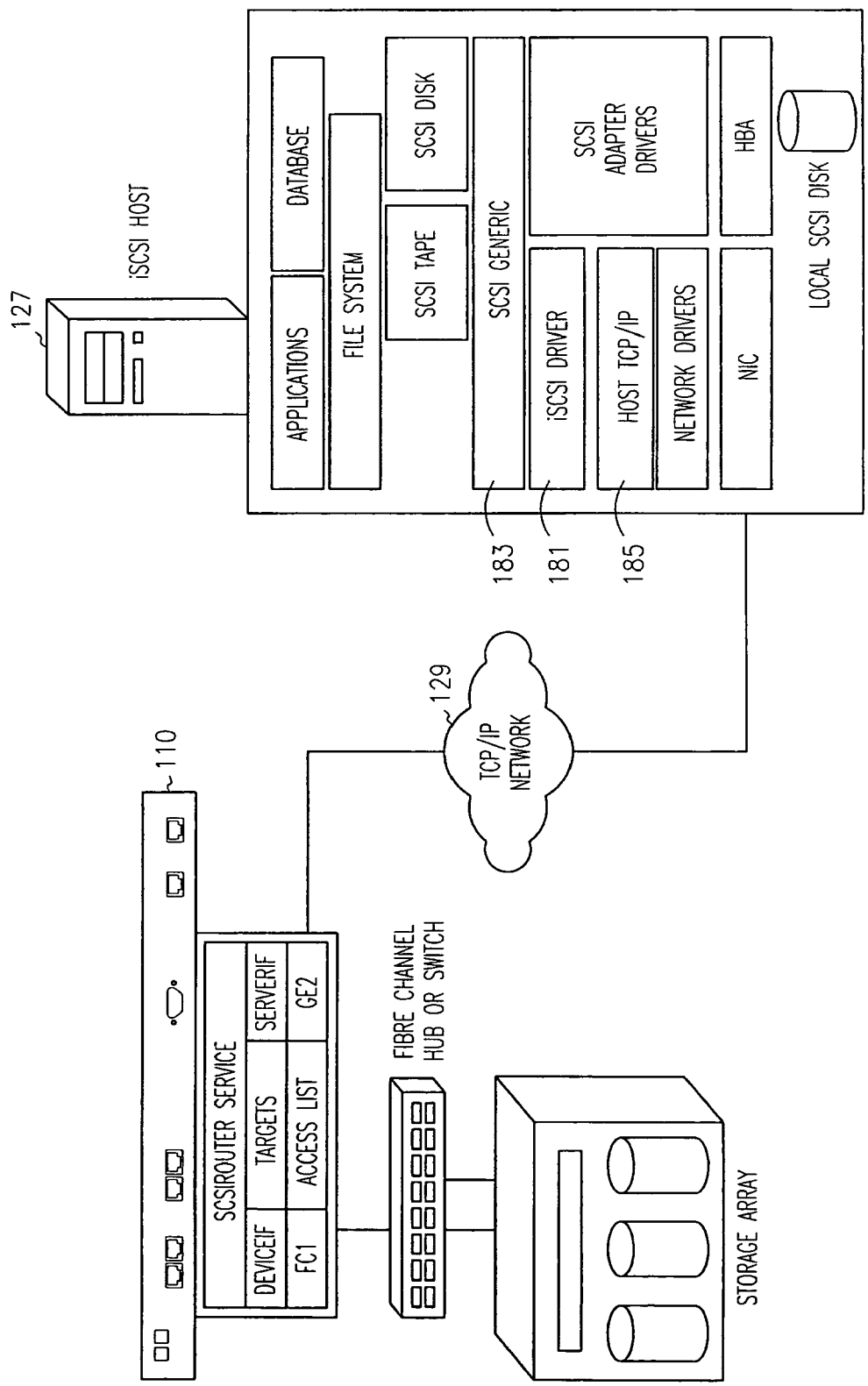
FIG. 10 is a block diagram of a SAN 100 showing naming and mapping.

In some embodiments, each server 127, 128 that requires IP access to storage 140 via the storage router 110 must have an iSCSI driver, such as the Cisco Storage Networking iSCSI driver, installed. One such embodiment is shown in FIG. 10, where an iSCSI driver 181 is inserted between the SCSI generic application 183 and the transport layer 185. Using the iSCSI protocol, iSCSI driver 181 allows a server 128 to generate SCSI requests and responses and transport them over an IP network 129. From the perspective of a server's operating system, the iSCSI driver appears to be a SCSI or Fibre Channel driver for a peripheral channel in the server 128.

As noted above, one disadvantage of systems for accessing SANs over IP networks is the lack of security. In contrast, security in system 100 takes advantage of the many mechanisms available for security services in IP networks. With existing SAN security, SSPs often have to allocate separate storage resources to each customer. In addition, the SSP has to worry about the segregation and privacy of the customer's data as it crosses the SSP's shared fiber optic infrastructure.

Concepts like virtual private networks, encryption, authentication, and access control do not exist in SANs. All of these concepts, however, are present in IP networks. By encapsulating SCSI over IP, the years of development of security in IP networks becomes instantly available to storage networks and to the storage service providers, allowing them to ensure access control to storage and the privacy of data on their shared infrastructure.

As noted above, today almost all client access to storage is accomplished by sending the requests through general-purpose servers that connect that the IP networks (LAN, WAN, etc.) to the storage networks (SAN). With storage router 110, and a SCSI/IP driver in the client, the general-purpose server is unnecessary. Eliminating this server allows for the rapid growth of storage service providers, companies who want to storage access across the Internet and large enterprise customers who want to allocate storage resources based on application, by department or by division.

In one embodiment, storage router 110 provides IPv4 router functionality between a single Gigabit Ethernet and a Fibre Channel interface. In one such embodiment, static routes are supported. In addition, storage router 110 supports a configurable MTU size for each interface, and has the ability to reassemble and refragment IP packets based on the MTU of the destination interface.

In one embodiment, storage router 110 acts as a gateway, converting SCSI protocol between Fibre Channel and TCP/IP. Storage router 110 is configured in such an embodiment to present Fibre Channel devices as iSCSI targets, providing the ability for clients on the IP network to directly access storage devices.

As noted above, today almost all client access to storage is accomplished by sending the requests through general-purpose servers that connect that the IP networks (LAN, WAN, etc.) to the storage networks (SAN). With storage router 110, and a SCSI/IP driver in the client, the general-purpose server is unnecessary. Eliminating this server allows for the rapid growth of storage service providers, companies who want to storage access across the Internet and large enterprise customers who want to allocate storage resources based on application, by department or by division.

The SCSI Router

In one embodiment, SCSI routing occurs in the Storage Router 110 through the mapping of physical storage devices to iSCSI targets. An iSCSI target (also called logical target) is an arbitrary name for a group of physical storage devices. You can map an iSCSI target to multiple physical devices. An iSCSI target always contains at least one Logical Unit Number (LUN). Each LUN on an iSCSI target is mapped to a single LUN on a physical storage target.

In one such embodiment, you can choose either of two types of storage mapping: target-and-LUN mapping or target-only mapping. Target-and-LUN mapping maps an iSCSI target and LUN combination to a physical storage target and LUN combination. Target-only mapping maps an iSCSI target to a physical storage target and its LUNs.

With target-and-LUN mapping, an iSCSI target name and iSCSI LUN number are specified and mapped to the physical storage address of one LUN. This mapping can take the form of a Loop ID+LUN combination, a WWPN+LUN combination, or a WWNN. If the LUN is available, it is made available as an iSCSI LUN and numbered with the iSCSI LUN number specified.

For example, if an iSCSI target and iSCSI LUN specified as Database, LUN 9 were mapped to the physical storage address, Loop ID 070, LUN 12, then LUN 127, 128 of the device identified as Loop ID 070 would be available as one iSCSI LUN. An iSCSI driver would see the iSCSI target named Database, with one iSCSI LUN identified as LUN 9. The iSCSI LUN would appear as one storage device to a server. (See Table 1 below.)

TABLE 1

Target-and-LUN Mapping Example

| Apparent to Server in Device File | iSCSI Target Name | iSCSI LUN Available | Physical Storage Address | Physical LUN Available |
|---|---|---|---|---|
| /dev/sdb2 Apparent as one locally attached storage device. (Linux device file used as an example.) | Database Database appears as one controller with one LUN available. | LUN 9 iSCSI LUN is numbered as specified and can be different than the physical LUN number. | Loop ID 070 Specifies the storage address of a storage controller. | LUN 12 The LUN number is specified as the only LUN to be mapped. |

With target-only mapping, an iSCSI target name is specified and mapped to the physical storage address of a storage controller only. This mapping can take the form of a; either a Loop ID or WWPN. Any LUNs that are available in the storage controller are made available as iSCSI LUNs and are numbered the same as the LUNs in the storage controller.

For example, if an iSCSI target specified as Webserver200 were mapped to the physical storage address Loop ID 050, and LUNs 1 through 3 were available in that controller, those LUNs would become available as three iSCSI LUNs. An iSCSI driver would see the iSCSI target named Webserver2000 as a controller with three iSCSI LUNs identified as LUN 1, LUN 2, and LUN 3. Each iSCSI LUN would appear as a separate storage device to a server. (See Table 2 below.)

TABLE 2

Target-only Mapping Example

| Apparent to Server in Device File | iSCSI Target Name | iSCSI LUNs Available | Physical Storage Address | Physical LUNs Available |
|---|---|---|---|---|
| /dev/sdb1 /dev/sde1 /dev/sdf1 Apparent as three locally attached storage devices. (Linux device file used as an example.) | Webserver200 Webserver200 Webserver200 Webserver200 appears as one controller. LUNs 1, 2, and 3 are available. | LUN 1 LUN 2 LUN 3 iSCSI LUNs are numbered the same as physical LUNs. | Loop ID 050 Loop ID 050 Loop ID 050 Specifies the storage address of a storage controller. | LUN 1 LUN 2 LUN 3 LUNs 1, 2, and 3 are available for mapping. |

Access for SCSI routing is controlled in computers 127, 128 and in storage router 110. In computer 127, for instance, the IP address of each storage router 110 with which computer 127 is to transport SCSI requests and responses is configured in the iSCSI driver. In storage router 110, an access list identifies which computers 127, 128 can access storage devices attached to it.

Once the access is configured in computers 127, 128 and in storage router 110, and once the storage mapping is configured in storage router 110, storage router 110 routes SCSI requests and responses between servers 127, 128 and the mapped storage devices 140. The concept of storage mapping and access control is illustrated in FIG. 4.

Figure 4:
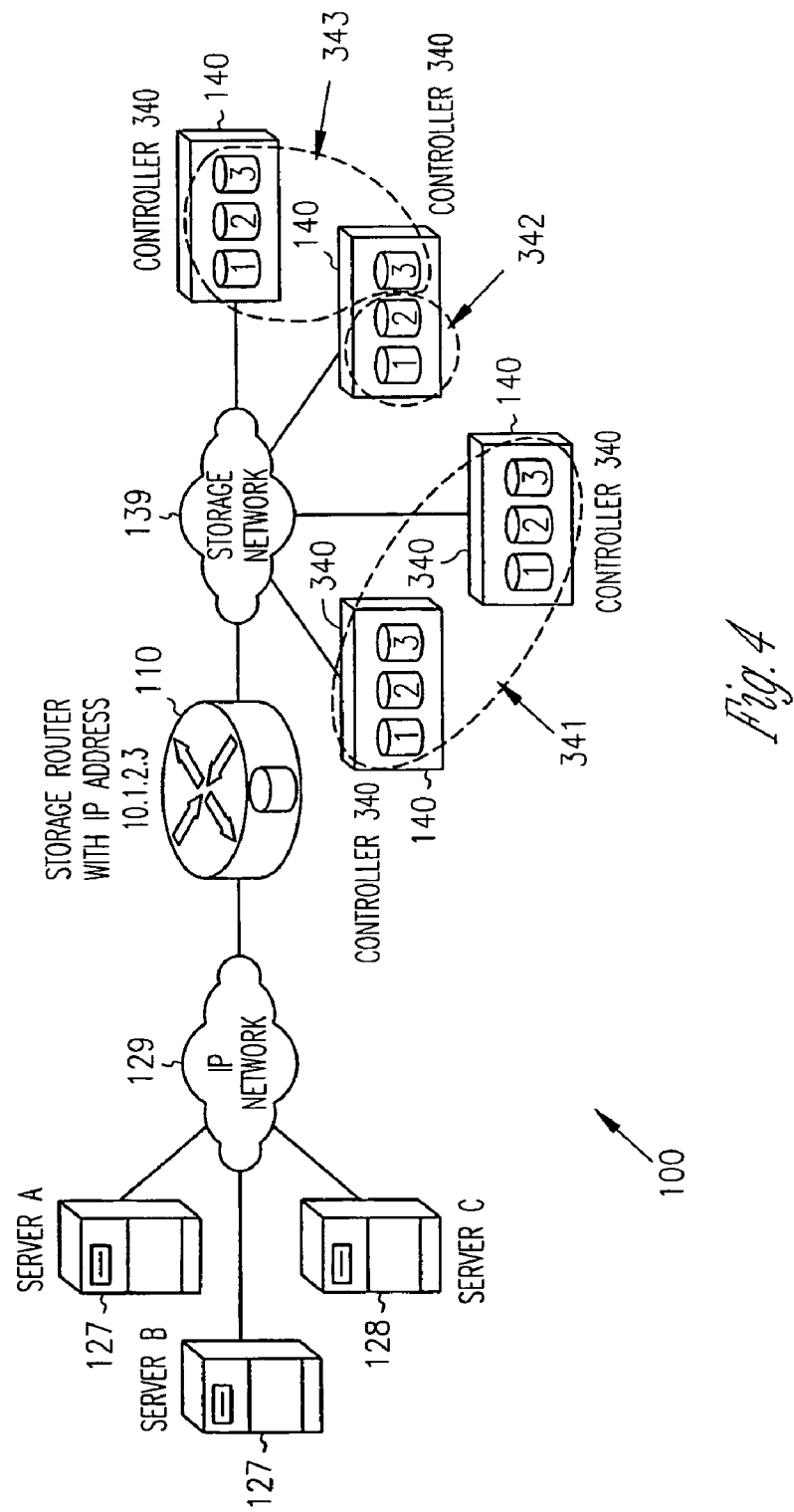
FIG. 4 is a block diagram representing the concept of storage mapping and access control.

In FIG. 4, Storage Router 18 provides three servers (127, 128) with IP access to disk drives controlled by four disk controllers 340. An iSCSI driver 181 in each server (127, 128) is configured to access storage router 110 at IP address 10.1.2.3. An access list 322 in storage router 110 specifies that servers A, B, and C are allowed to access the mapped storage devices. From the perspective of a server, each disk drive mapped to it appears as a locally attached disk drive. Table 3 shows the correlation between access list 322, the storage router IP address, and the storage device mapping.

TABLE 3

Storage Mapping and Access Control Concept

| Servers Allowed Access via Access List | Storage Devices Apparent to Server as Locally Attached Devices | Via Storage Router IP Address | Mapped To Controller | Mapped To Drive |
|---|---|---|---|---|
| Server A | Drive D | 10.1.2.3 | 1 | 1 |
|  | Drive E | 10.1.2.3 | 1 | 2 |
|  | Drive F | 10.1.2.3 | 1 | 3 |
|  | Drive G | 10.1.2.3 | 2 | 1 |
|  | Drive H | 10.1.2.3 | 2 | 2 |
|  | Drive I | 10.1.2.3 | 2 | 3 |
| Server B | Drive D | 10.1.2.3 | 3 | 1 |
|  | Drive E | 10.1.2.3 | 3 | 2 |
| Server C | Drive D | 10.1.2.3 | 4 | 1 |
|  | Drive E | 10.1.2.3 | 4 | 2 |
|  | Drive F | 10.1.2.3 | 4 | 3 |
|  | Drive G | 10.1.2.3 | 3 | 3 |

The system 100 illustrated in FIG. 4, and the contents of Table 3 above, illustrate the concept of storage mapping and access control. The IP addresses will vary, of course, according to each system 100. Similarly, the type of storage addressing (for example, WWNN, WWPN and LUN, or Loop ID and LUN) will vary according to the types of storage and the types of storage addressing preferred at each site.

In the example shown in FIG. 4, the three servers (labeled Server A, Server B, and Server C) package storage commands into IP packets addressed to a storage router 110 having IP address 10.1.2.3. Storage router 110 extracts the iSCSI commands from the IP packet(s) and maps the storage addresses from those provided by the servers 127, 128 to those used by the four disk controllers 340. As noted above, driver 181 in each server 127-128 is configured to access the storage router at IP address "10.1.2.3". An access list 322 (see FIG. 5) in the storage router 110 specifies the storage devices 140 that can be accessed by servers A, B, and C. From the perspective of each server, each disk drive mapped to it appears as a locally attached disk drive. FIG. 4 is discussed in more detail below.

Figure 5:
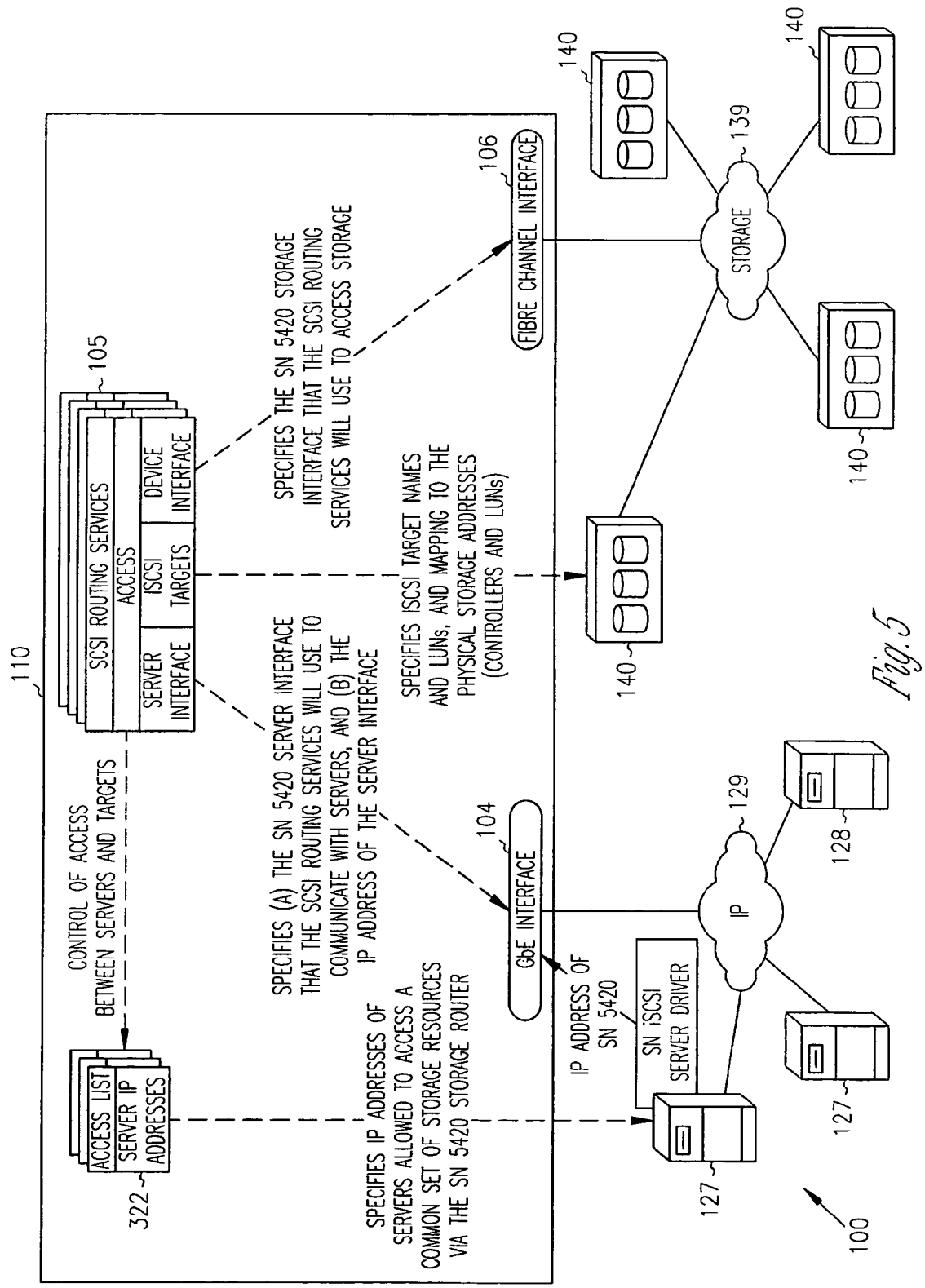
FIG. 5 is a block diagram of internal functions of storage router 110.

FIG. 5 is a block diagram of internal functions of storage router 110. In each computer 127, 128, a iSCSI server driver 181 is set up with the IP address of storage router 110 (i.e., the address of GbE interface 104). Each SCSI router session or instance 105 has an access list 322, which checks the requests received against those that are allowed, i.e., the access list specified IP addresses of those servers that are allowed access to a common set of storage resources 140. In one embodiment, each SCSI router session specifies the server interface, the IP address of the server interface; the iSCSI targets, the mapping to the physical storage and the device interface. The server interface is the server interface that the SCSI router session will use to communicate with the servers 127, 128. The iSCSI targets are identified by iSCSI target name and LUN. The mapping to the physical storage addresses is by controller and/or LUN. The device interface specifies the storage interface that the SCSI routing services will use to access storage 140.

Figure 8:
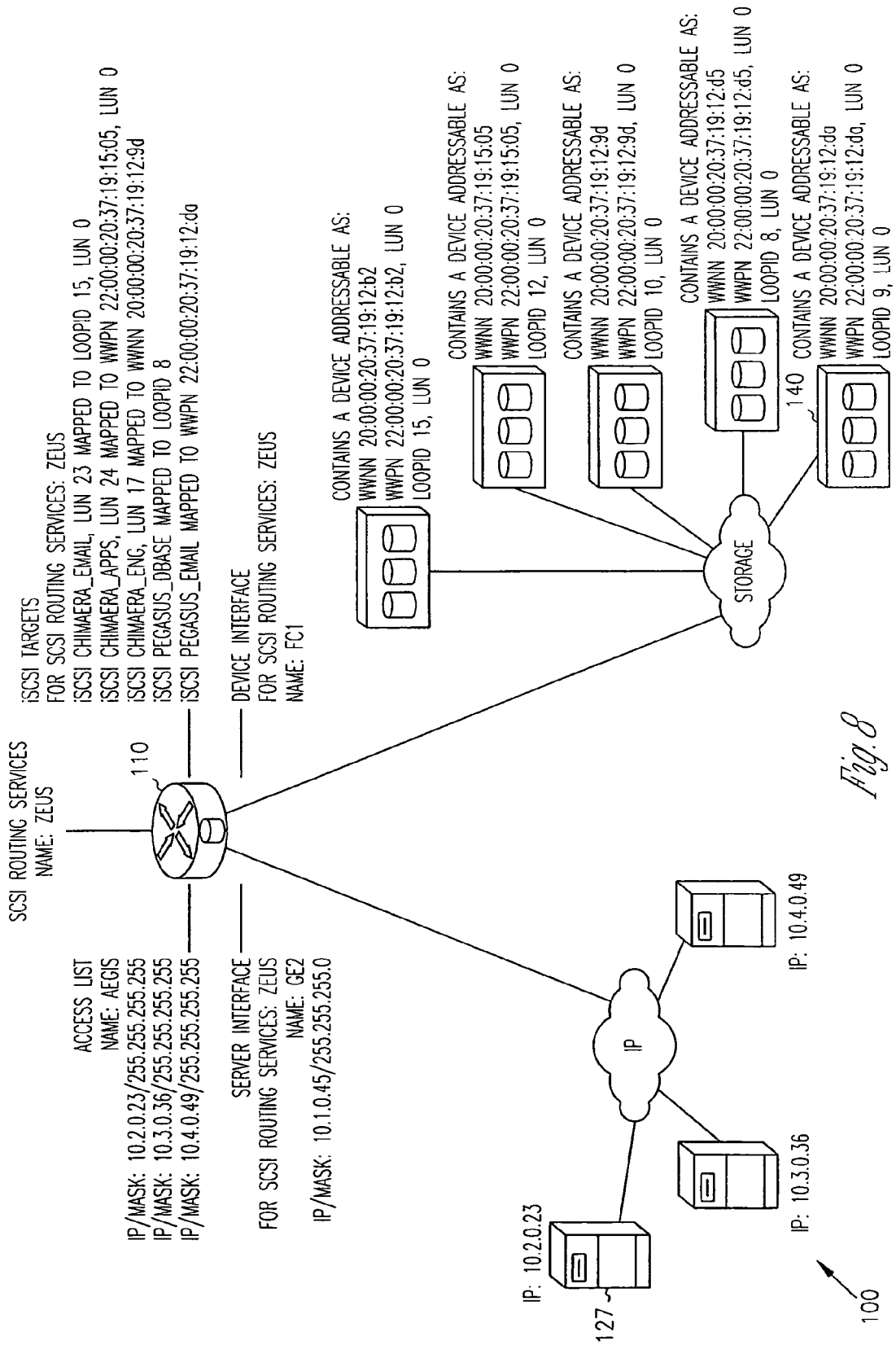
FIG. 8 is a block diagram of a SAN 100 showing naming and mapping.

An example of iSCSI routing according to the present invention is illustrated in FIG. 8. In the example given in FIG. 8, an access list 322 consists of a list of the IP addresses of servers 127 that will have permission to access storage devices 140 via iSCSI target names. In one embodiment, Table 4 is used to create access list 322.

TABLE 4

| | Command | Description |
| --- | --- | --- |
| Step 1 | enable | Enter Administrator mode. |
| Step 2 | create accesslist aegis | Create an access list; for example, create an access list named aegis. |
| Step 3 | add accesslist aegis 10.2.0.23/32, 10.3.0.36/32, 10.4.0.49/32 | Add IP addresses to the access list. For example, add the following IP addresses to the access list named aegis: 10.2.0.23, 10.3.0.36, and 10.4.0.49. Set the network mask for each IP address to 255.255.255.255 to limit the access to each IP address. |

Creating SCSI routing services consists of creating and naming a base set of SCSI routing services. Table 5 illustrates one method of creating SCSI routing services.

TABLE 5

| | Command | Description |
| --- | --- | --- |
| Step 1 | enable | Enter Administrator mode. |
| Step 2 | create scsirouter zeus | Create a SCSI routing service instance named zeus. |

In one embodiment, it is possible to define up to four instances on a single storage router 110 or across a cluster of routers 110.

Configuring a server interface consists of identifying which SCSI routing service instances to add to the server interface, identifying the server interface name, and assigning an IP address to the server interface. Table 6 illustrates one method of configuring a server interface for an instance of SCSI routing services.

TABLE 6

| | Command | Description |
| --- | --- | --- |
| Step 1 | enable | Enter Administrator mode. |
| Step 2 | add scsirouter zeus serverif ge2 10.1.0.45/24 | Add server interface to SCSI routing services name zeus. Specify an IP address that servers will use to access the SCSI routing services, zeus. In addition, set the IP netmask to 255.255.255.0. |

Configuring a device interface consists of specifying which SCSI routing service instances to add to the device interface and the device interface name and topology. Table 7 illustrates one method of configuring a device interface for an instance of SCSI routing services.

TABLE 7

| | Command | Description |
| --- | --- | --- |
| Step 1 | enable | Enter Administrator mode. |
| Step 2 | add scsirouter zeus deviceif fc1 | Add device interface to SCSI routing services named zeus. This will be the interface in the storage router that the SCSI routing services will use to access physical storage devices. |
| Step 3 | set interface fc1 topology loop or set interface fc1 topology ptp | Set the device interface topology. The device interface is configured to attempt link activation in a point-to-point topology, by default. If point-to-point is not successful, a loop topology is assumed. If the storage devices are all connected to a hub with the intention of running in an arbitrated loop, change the device interface topology to loop, as shown in the first example. If the storage devices are all connected in a point-to-point topology, change the device interface topology to ptp, as shown in the second example. |
| Step 4 | save all | Save your configuration before rebooting the storage router. |
| Step 5 | reboot | Reboot the storage router. A reboot is necessary to make the new interface topology selection effective. |

Once the device interface is added, the SCSI routing service instance becomes active.

Configuring iSCSI targets 140 consists of specifying the SCSI routing services to which the iSCSI target is to be added, specifying an iSCSI target, and mapping the iSCSI target to a physical storage device 140. When adding an iSCSI target, you can specify the physical storage device 140 either by physical storage address or by an index number assigned to the device. Some representative addressing modes are shown in FIG. 8 for each device 140.

High Availability Applications

One can configure a plurality of storage routers 100 in a cluster 300 to allow the storage routers 110 to back each other up in case of failure. A storage router cluster 300 includes, in some embodiments, two configured storage routers 110 connected as follows:

Both connected to the same servers 127, 128,

Both connected to the same storage systems 340, and

Both connected to each other through their management and high availability interfaces. In other embodiments, more than two storage routers 110 are used.

Figure 11:
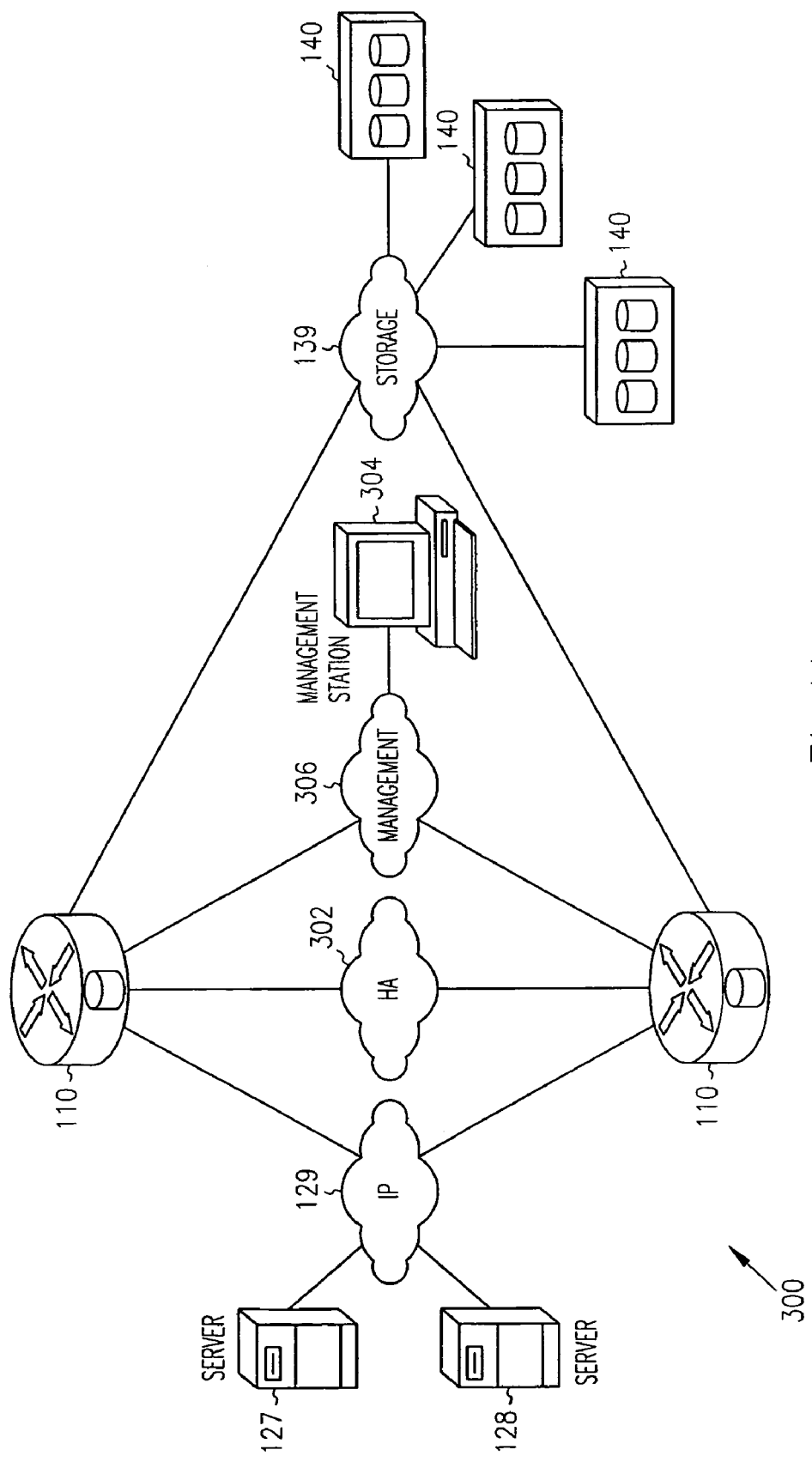
FIG. 11 shows a block diagram of a sample storage-router network 200.

In one embodiment, storage routers 110 within a cluster 300 continually exchange HA information to propagate configuration data to each other and to detect failures in the cluster. In one such embodiment (such as is shown in FIG. 11), storage routers 110 exchange HA information through two separate networks: one connected to the management interface 158 of each storage router 110 and the other connected to the high availability interface 148 of each storage router 110. To make sure that HA information is exchanged reliably between storage routers 1 10, in one embodiment, storage routers 110 balance the transmission of HA information between the management and the high availability interfaces. In one such embodiment, configuration information is exchanged in the manner described in "METHOD AND APPARATUS FOR EXCHANGING CONFIGURATION INFORMATION BETWEEN NODES OPERATING IN A MASTER-SLAVE CONFIGURATION," U.S. patent application Ser. No. 10/128,657, filed herewith, the description of which is incorporated herein by reference.

In one embodiment, each cluster 300 supports up to four active SCSI routing service instances. In one such embodiment, at any given time, a SCSI routing service instance can run on only one storage router 110 in a cluster 300. The SCSI routing service instance continues running on the storage router 110 where it was started until it is explicitly stopped or failed over to another storage router 110 in the cluster 300, or automatically fails over to another storage router 110 because an interface is unavailable or another software or hardware problem occurs.

In one embodiment, each storage router 110 in cluster 300 can run up to four SCSI routing service instances. For example, if one storage router is already running two SCSI routing service instances, it is eligible to run up to two additional SCSI routing service instances.

One example of configuring management parameters within router 110 is given in Table 8. In the example provided in Table 8, configuring management parameters includes tasks such as setting the system name, IP address and mask, gateway, and DNS servers.

One example of configuring network management access within router 110 is given in Table 9. In the example provided in Table 9, configuring network management access consists of tasks for SNMP.

TABLE 9

| | Command | Description |
|---|---|---|
| Step 1 | enable | Enter Administrator mode. |
| Step 2 | set snmp getcommunity public | Specify the name of the community having read access of the storage router network; that is, to which community's GET commands the storage router will respond. |
| Step 3 | set snmp setcommunity mynetmanagers | Specify the name of the community having write access to the storage router network; that is, to which community's SET commands the storage router will respond. |
| Step 4 | set snmp traphosts primary 10.1.30.17 secondary | Specify the primary address for SNMPv1 TRAPs and (optionally) specify the secondary address for SNMPv1 TRAPs. Note In this configuration example, the trap hosts have IP addresses that are outside the |

TABLE 8

| | Command | Description |
|---|---|---|
| Step 1 | enable | Enter Administrator mode. |
| Step 2 | set systemname SN_5420-MG1 | Configure a name for the management interface. |
| Step 3 | set mgmt ipaddress 10.1.10.244/24 | Configure the management interface with an IP address and subnet mask. Note If this storage router is to participate in a cluster, the management interface for all storage routers in the cluster should be on the same network. |
| Step 4 | add route 10.1.30.0/24 gw 10.1.10.201 | (Optional) Configure a gateway IP address if the storage router is to be managed from a management station outside the storage router management subnet. The gateway (gw keyword) IP address specifies a gateway on the storage router management network that will provide access to a management station. Note In this configuration example, the mask is set to 24 (255.255.255.0) to allow any host on subnet 10.1.30.0 to be a management station. |
| Step 5 | set nameserver 10.1.40.243 domain mystoragenet.com | (Optional) Set the primary DNS IP address. Specifies the IP address of the primary DNS server if the management interface IP address is to be correlated with a DNS host name. Optionally, specify the domain name of the storage router. |
| Step 6 | add route 10.1.40.243/32 gw 10.1.10.201 | (Optional) Configure a gateway IP address if the primary DNS server is outside the storage router management subnet. The gateway (gw keyword) IP address specifies a gateway on the storage router management network that will provide access to a primary DNS server. Note In this configuration example, the mask is set to 32 (255.255.255.255) to specify the host with IP address 10.1.40.243 (the primary DNS server). |
| Step 7 | set secnameserver 10.1.50.249 | (Optional) Set the secondary DNS IP address. Specifies the IP address of the secondary DNS server. |
| Step 8 | add route 10.1.50.249/32 gw 10.1.10.201 | (Optional) Configure a gateway IP address if the secondary DNS server is outside the storage router management subnet. The gateway (gw keyword) IP address specifies a gateway on the storage router management network that will provide access to a secondary DNS server. Note In this configuration example, the mask is set to 32 (255.255.255.255) to specify the host with IP address 10.1.50.249 (the secondary DNS server). |

TABLE 9-continued

| | Command | Description |
|---|---|---|
| | 10.1.30.18 | storage router management subnet. In an earlier step (see Table 8), a gateway was specified providing access to hosts on the 10.1.30.0 subnet. |

When the storage router 110 is part of a storage router cluster 300, you will need to configure the high availability (HA) interface. In one embodiment, Table 10 can be used to configure the HA interface parameters.

TABLE 10

| | Command | Description |
|---|---|---|
| Step 1 | enable | Enter Administrator mode. |
| Step 2 | set ha ipaddress 10.1.20.56/24 | Configure the HA interface with an IP address and subnet mask. Note The HA and management interfaces must not be on the same network; each interface must be on a unique IP network. In a cluster, the HA interfaces for all storage routers should be on the same network. |
| Step 3 | save system | Save system parameters. |
| Step 4 | set cluster Mt_Olympus | Set the cluster name in which the storage router is to participate. Follow the prompts from this command to either merge or delete the storage router configuration. Merging means that the configuration of this storage router (including SCSI routing services) is propagated to other storage routers in the named cluster. Deleting means that the existing configuration (including SCSI routing services) will be deleted from the storage router. If you are joining an existing cluster, any access lists that you have previously defined will be overwritten by the access lists available to the cluster. This occurs regardless of your decision to merge or delete configuration information. If you wish to make your current access lists available to the cluster, you must save them to a file before joining the cluster, then restore them. |

In one embodiment, completing step 4 in Table 10 will cause the storage router 110 to reboot.

In one embodiment, one of the storage routers 110 operates in master mode and another operates in slave mode within cluster 300. In one such embodiment, each router 110 is able to handle multiple application instances. Each router 110 has at least one state machine in the Null State at all times, and that state machine is waiting to discover new application instances within the other nodes of the network. This state machine is referred to as an "idle state machine," indicating that it is idling until a new application instance is discovered. Such an approach is described in application Ser. No. 10/122,401, filed Apr. 11, 2002, entitled "METHOD AND APPARATUS FOR SUPPORTING COMMUNICATIONS BETWEEN NODES OPERATING IN A MASTER-SLAVE CONFIGURATION", which is a continuation of application Ser. No. 09/949,182, filed Sep. 7, 2001, entitled "METHOD AND APPARATUS FOR SUPPORTING COMMUNICATIONS BETWEEN NODES OPERATING IN A MASTER-SLAVE CONFIGURATION", the description of which is incorporated herein by reference.

In one such embodiment, each of the storage routers 110 exchanges heartbeat information. Such an approach is described in application Ser. No. 10/094,552, filed Mar. 7, 2002, entitled "METHOD AND APPARATUS FOR EXCHANGING HEARTBEAT MESSAGES AND CONFIGURATION INFORMATION BETWEEN NODES OPERATING IN A MASTER-SLAVE CONFIGURATION".

The inclusion of the idle state machine in this embodiment provides an advantage over previous approaches. Previous approaches assume that only one type of application instance exists within the node and within the other networked nodes (i.e., a time synchronization application). Accordingly, these approaches promptly enters either the master state or slave state upon initiation of the application, and only one master or slave state machine is maintained by a router 110 at any one time. That approach, therefore, is incapable of managing multiple application instances on the nodes, or listening for new application instances on the network.

In contrast, this approach described above always has one or more state machines in the Null State, and so it can provide a new state machine whenever a new application instance is started in router 110 or is discovered in another router 110 through the receipt of a MasterAck or Heartbeat message from that other router 110.

In addition, high-availability is enhanced in storage router 110 by providing multiple pathways between storage routers 110 (such as is shown in networks 302 and 306 in FIG. 11. In addition, in one embodiment, high availability traffic is shared across network 129 as well.

Application Ser. No. 10/131,275, filed even date herewith, entitled "METHOD AND APPARATUS FOR CONFIGURING NODES AS MASTERS OR SLAVES" and application Ser. No. 10/131,274, filed even date herewith, entitled "METHOD AND APPARATUS FOR TERMINATING APPLICATIONS IN A HIGH-AVAILABILITY NETWORK", also contain information relevant to configuring storage routers 110 within a high availability cluster 300. Their descriptions are incorporated herein by reference.

Figure 6:
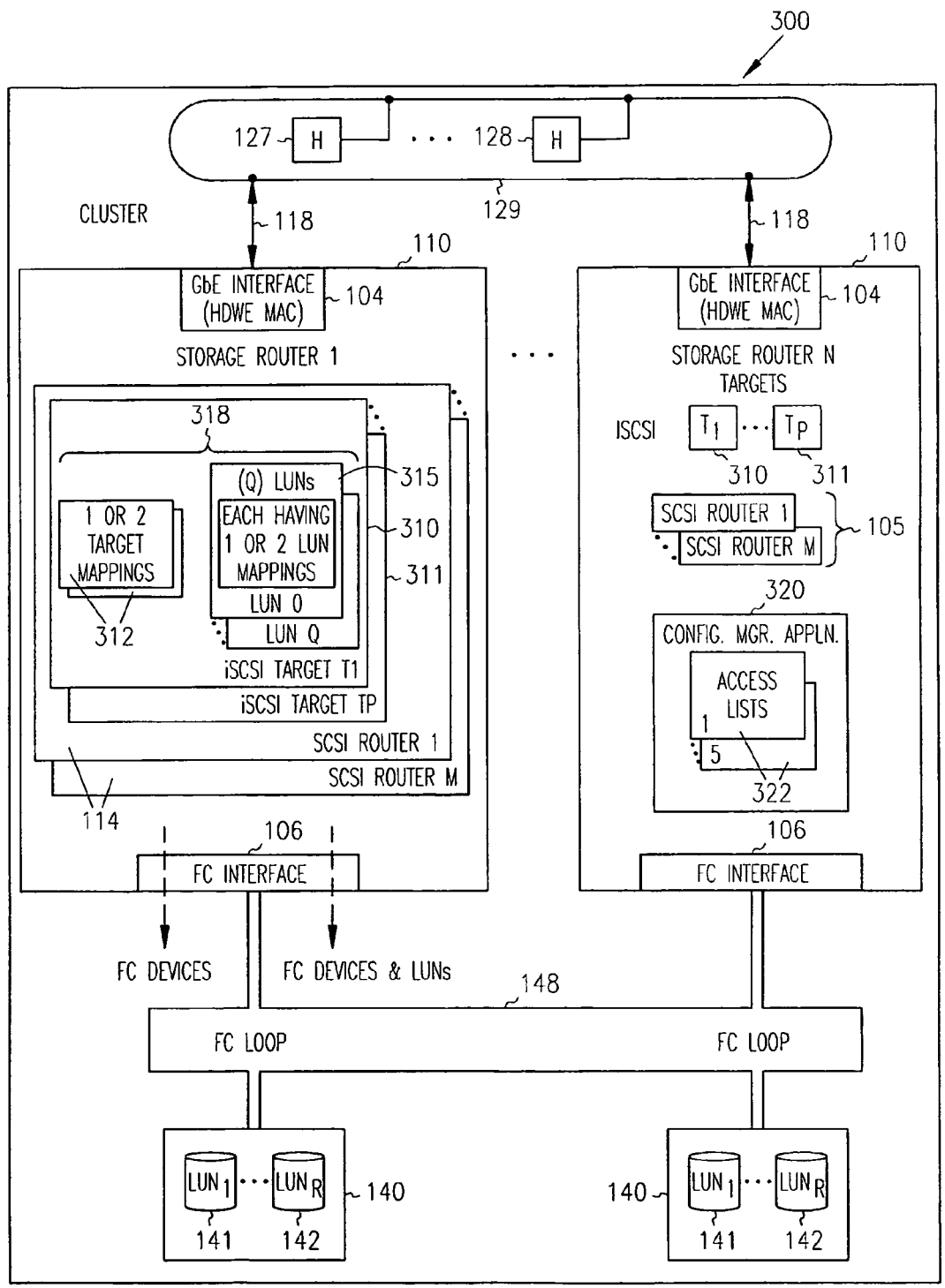
FIG. 6 shows an exemplary storage-router cluster 300 showing SCSI routing.

FIG. 6 illustrates an exemplary storage-router cluster 300. Cluster 300 includes a plurality of computers or hosts 127-128 connected on network 129 to a plurality of storage routers 110 using GbE connections 118 to GbE interfaces 104. In some embodiments, each GbE interface 104 has a hardware MAC address used to identify IP packets destined for that particular GbE interface 104. In some embodiments, this hardware MAC address is replaced by a MAC address that includes at least a portion of an IP address used to route packets. A method for generating a MAC address as a function of the network 129 is described in "VIRTUAL MAC ADDRESS SYSTEM AND METHOD", U.S. patent application Ser. No. 10/131,782, filed herewith, the description of which is incorporated herein by reference.

In one embodiment, respective sessions are created between a respective host (from among hosts 127 through 128) and a particular iSCSI target (from among targets 310 through 311). SCSI routing occurs in storage router 110 through the mapping between physical storage devices (or LUNs located on physical devices) and iSCSI targets (310-311). An iSCSI target (e.g., 310, also called logical target 310) is an arbitrary name or value for a group of one or more physical storage devices. One can map a single iSCSI target to multiple physical devices. An iSCSI target always includes or contains at least one Logical Unit Number (LUN). Each LUN on an iSCSI target is mapped to a single LUN on a physical storage target.

In one embodiment, SCSI router 105 includes one or more instances 114, one for each iSCSI target 310-311. Each instance 114 uses the respective mapping 318 to convert the iSCSI address to the physical address used to access a particular LUN 141-142. In some embodiments, a configuration manager application 320 uses one or more access lists 322 to control access to particular LUNs, i.e., to check that the particular source computer 127-128 has authorization to access the particular LUN 141-142 on one particular target 140.

The storage network 149, in some embodiments, is implemented as a fibre-channel loop 148 as shown in FIG. 6. In other embodiments, storage network 149 is implemented as a fibre-channel fabric.

In one embodiment, one can choose between two types of storage mapping: target-and-LUN mapping 314 or target-only mapping 312. As described above, target-and-LUN mapping 314 maps an iSCSI-target-and-LUN combination to a physical storage target-and-LUN combination. Target-only mapping maps an iSCSI target to a physical storage target and its associated LUNs.

In one embodiment, SCSI router 105 includes two or more virtual SCSI routers 114. Each virtual SCSI router 114 is associated with one or more IP sessions. Such an embodiment is described in "VIRTUAL SCSI BUS FOR SCSI-BASED STORAGE AREA NETWORK", U.S. patent application Ser. No. 10/131,793, filed herewith, the description of which is incorporated herein by reference.

In one embodiment, each interface 104 performs TCP connection checking on iSCSI traffic. TCP connection checking is described in "METHOD AND APPARATUS FOR ASSOCIATING AN IP ADDRESS AND INTERFACE TO A SCSI ROUTING INSTANCE", U.S. patent application Ser. No. 10/131,789, now U.S. Pat. No. 6,895,461, issued on May 17, 2005, filed herewith, the description of which is incorporated herein by reference.

Figure 7:
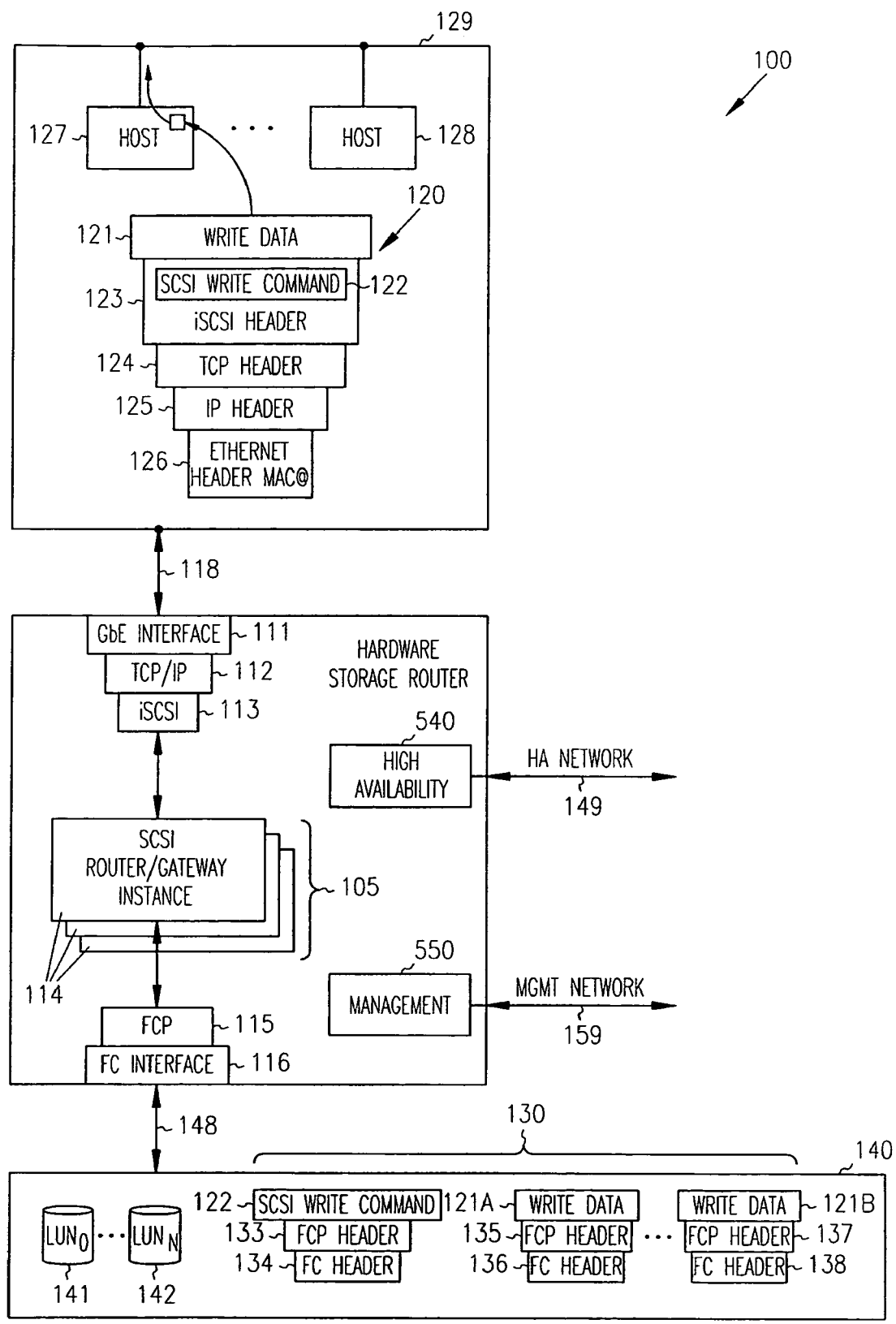
FIG. 7 shows the headers added to the iSCSI and to the fibre-channel commands and data.

FIG. 7 shows the headers added to the iSCSI and to the fibre-channel commands and data. On the host end (computers 127-128) the "write" command 122 and the associated data 121 to be written are embedded into one or more packets 120, by adding an iSCSI header 123, a TCP header 124, an IP header 125, and an ethernet header 126, having the MAC address of the GbE interface 111 of the destination. These packets are passed on network 129, and input through connection 118. GbE interface 111 processes the packets and removes header 126. TCP/IP interface 112 processes the packets and removes headers 125 and 124. iSCSI interface 113 processes the packets and removes header 123 and directs one of the sessions 114 (as specified in the iSCSI header) to perform its mapping to a physical storage address used by storage device 140, and the session 114 processes the mapped packets 130, for example, mapped to a fibre channel data structure 130, having a FCP header added by FCP interface 115 and an FC header added by FC interface 116. In some embodiments, this separates the write command 122 and one or more data portions 121A-121B having separate FCP headers 133, 135, and 137 respectively, and FC headers 134, 136, and 138 respectively.

As noted above, SCSI routing occurs in the Storage Router 110 through the mapping of physical storage devices to iSCSI targets. An iSCSI target (also called a logical target) is an arbitrary name for a group of physical storage devices. You can map an iSCSI target to multiple physical devices. An iSCSI target always contains at least one Logical Unit Number (LUN). Each LUN on an iSCSI target is mapped to a single LUN on a physical storage target.

Configuration module 320 operates to configure various aspects of storage router 110, including the mappings described above. In addition, configuration module 320 may be used to configure communications with storage network 139 and IP network 129.

In some embodiments, the configuration data may be supplied through a command interpreter. Such a command interpreter is described in "SYSTEM AND METHOD FOR CONFIGURING FIBRE-CHANNEL DEVICES", U.S. patent application Ser. No. 10/128,655, filed herewith, now U.S. Pat. No. 7,200,610, issued on Apr. 3, 2007, the description of which is incorporated herein by reference.

In one embodiment, the command interpreter is command line based. However, the invention is not limited to any particular form of command interpreter, and in alternative embodiments of the invention, the command interpreter may include a graphical user interface.

Database 318 includes information regarding devices on the storage area network 139. Database 322 includes one or more access lists as described above. In one embodiment, databases 318 and 322 are in-memory databases comprising one or more structures containing device data. For example, databases 318 and 322 may comprise a table, an array, a linked list of entries, or any combination thereof. Additionally, databases 318 and 322 may comprise one or more files on a file system. Furthermore, either of databases 318 and 322 may comprise a relational database management system. The invention is not limited to any particular database type or combination of database types. Databases 318 and 322 may exist as two or more databases. In one embodiment, databases 318 and 322 are combined in a single database.

Figure 12:
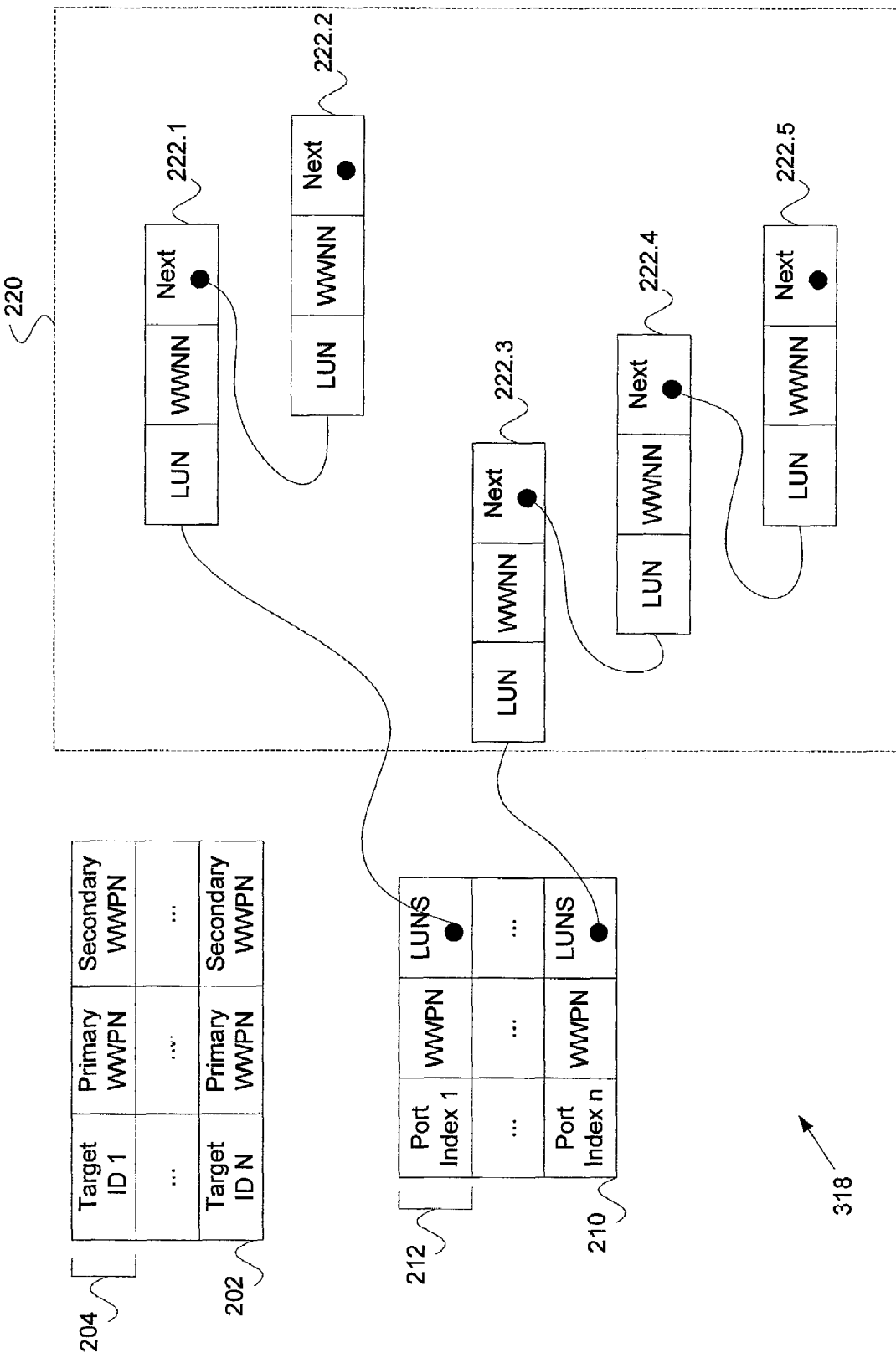
FIG. 12 illustrates a device database which could be used in the present invention.

FIG. 12 provides further details of an exemplary device database 318 used in some embodiments of the invention. Exemplary device database 318 includes a port database 210 and a LUN database 220. Additionally, some embodiments of the invention include an alternative path database 202.

Port database 210 comprises a set of fields providing information about ports in a network, including storage area networks. In some embodiments, port database 210 includes one or more entries 212 having a set of fields. In some embodiments, the fields in port database 210 include a port index, a port WWPN, and LUN list. The port index uniquely identifies an entry in port database 210. In some embodiments, the port index can be inferred by the position of the entry in the table, and need not be physically present. The port WWPN field contains data specifying the WWPN for the port. The LUN list field contains data that identifies the LUNs associated with the port. In some embodiments, the LUN list field is a link (i.e. a pointer) to a linked list of LUN database entries. However, the invention is not limited to any particular representation for the LUN list field, and in alternative embodiments the LUN list field may be a table or array of LUN list entries.

LUN database 220 comprises a set of fields that provide information about LUNs in a network. Typically the LUNs will be associated with a port. In some embodiments, the LUN database comprises a linked list of entries 222. In some embodiments, the fields in port database 220 include a LUN field, a WWNN field, and a next LUN link. The LUN field contains data identifying the LUN. The WWNN field contains the WWNN associated with the LUN. The next LUN field comprises data identifying the next LUN in a list of LUNs.

Some embodiments of the invention include an alternative path database 202. Alternative path database 202 comprises one or more entries 204 that define paths to targets available in a storage network. In some embodiments, the fields in an entry 204 include a target ID, a primary WWPN, and a secondary WWPN. The target ID identifies a particular target in a storage area network. The primary WWPN field contains data identifying the primary WWPN, that is, the WWPN that the system will attempt to use first when communicating with the target. The secondary WWPN contains data identifying the secondary WWPN for the target. The system will use the secondary WWPN to communicate with the target if the primary WWPN is not available.

In some embodiments, a discovery process is used to provide data for some portions of database 318. The discovery process comprises logic to determine the devices 140 that are communicably coupled to a storage network 139. Several different events may trigger the discovery process. For example, the discovery process may execute when the system is initialized, when the system is reset, when a new device is added to the storage network, or when a device on the storage network changes state. The discover logic may be executed in firmware, or it may be executed in software, for example, in a device driver. As those of skill in the art will appreciate, the discovery process will differ depending on the type of storage network 139 coupled to storage router 110.

An exemplary discovery process for a fibre-channel based storage network used in some embodiments of the invention will now be described. In some embodiments, discovery comprises two main steps, port discovery and device discovery. Port discovery determines the target and/or initiator ports on the fibre-channel, and device discovery determines the LUNs (Logical Unit Numbers) on each target port.

As is known in the art, fibre-channel networks may exist in a number of different network topologies. Examples of such network topologies include private loops, public loops, or fabrics. The port discovery process in different embodiments of the invention may vary according to the network topology.

In loop based topologies, such as private or public loops, some embodiments of the invention, the discovery process acquires a loop map. The loop map is typically created during low-level loop initialization. In some embodiments, the loop map comprises an ALPA (Arbitrated Loop Physical Address) map. For each port in the loop map, the discovery process populates various fields of the port database. In some embodiments, these fields include the world wide port name (WWPN), the ALPA/loopid, and the port role (e.g. target and/or initiator). If the loop is a private loop, the port discovery process is generally complete when each port in the loop map has been processed. If the loop is a public loop, port discovery continues with the discovery of devices connected to the fabric.

In fabric-based topologies, the discovery process communicates with a fabric directory server (also referred to as a name server) and obtains a list of all devices known to the fabric switch. In some embodiments, a series of "Get All Next ($GA_{13}$ NXT) extended link service commands are issued to the storage network to obtain the list. The directory server responds with the port identifier (portId) and WWPN for the port. This data may then be used to populate various fields of the port database 210.

In some embodiments, after port discovery as discovered ports on the storage network, device discovery identifies devices on each port. In some embodiments, for each port found during port discovery that is a target device, a "Report LUNS" SCSI command is issued to LUN 0 on the port. If the device supports the command, the device returns a list of LUNs on the port. If the device does not support the command, the discovery process of some embodiments builds a local list of LUNs comprising LUN 0 to LUN 255.

For each LUN in the list, the discovery process issues one or more SCSI inquiry commands. These commands and the returned data include the following:

| | |
|---|---|
| Standard Inquiry- | returns the device type, offline/online flags, vendor data, product data, and version data for the LUN. |
| Device ID Inquiry- | Returns the world wide node name (WWNN) of the LUN. |
| Serial Number Inquiry- | Returns the serial number for the LUN. |

The data returned by the above-described commands is the used to populate corresponding fields in the LUN database 220.

It should be noted that while the exemplary environment has been described in terms of a storage router, the present invention may be implemented in any type of network element, including IP routers, switches, hubs and/or gateways.

Applications

Applications of computer system 100 will be discussed next. For instance, by using system 100, a Storage Service Provider (SSP) is able to immediately deploy new storage services at lower costs. Moving storage over the IP infrastructure also allows the SSP to offer customers secure (encrypted) access to storage at price points not possible with today's storage products.

As noted above, customers outsource their storage to a SSP provider who will manage their storage needs for a predetermined fee. A typical application would use a distributed Fibre-Channel (FC) network to connect an IP network to FC devices located at either a local or a remote site. In this example, the SSP provides the entire storage infrastructure on the customers premises. While Fibre Channel has numerous advantages, it lacks network management tools and is significantly higher priced than comparable Ethernet products. Most importantly, due to lack of network security, the SSP must create a separate Storage Area Networks (SAN) for each customer at the SSP to separate data from multiple customers.

In contrast, system 100 (as illustrated in FIG. 4) can use one SAN for multiple customers due to the security features (e.g., LUN mapping and masking) available in system 100. In addition, the use of IP products throughout system 100 lowers the total cost of implementation and adds advantages such as greater ability to scale, improved management tools and increased security.

In another application, the Application/Internet Service Provider (ASP/ISP) is able to centralize Web server storage using system 100. Centralization using system 100 dramatically lowers the cost of storage for Web servers and provides a means of backing up real-time data over IP.

Finally, enterprise customers gain significant cost savings in deploying storage over IP by leveraging their installed IP infrastructure. As storage becomes universally accessible using IP, local applications also will be able to be shared globally, greatly simplifying the task of managing storage. Mirroring and off-site backup of data over the IP infrastructure is expected to be an important application.

CONCLUSION

Systems, methods and apparatus to integrate IP network routing and SCSI data storage have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, although described in procedural terms, one of ordinary skill in the art will appreciate that the invention can be implemented in an object-oriented design environment or any other design environment that provides the required relationships.

In the above discussion and in the attached appendices, the term ☐computer☐ is defined to include any digital or analog data processing unit. Examples include any personal computer, workstation, set top box, mainframe, server, supercomputer, laptop or personal digital assistant capable of embodying the inventions described herein.

Examples of articles comprising computer readable media are floppy disks, hard drives, CD-ROM or DVD media or any other read-write or read-only memory device.

Although specific embodiments have been illustrated and described herein, it will be appreciated by those of ordinary skill in the art that any arrangement calculated to achieve the same purpose maybe substituted for the specific embodiment shown. This application is intended to cover any adaptations or variations of the present invention. Therefore, it is intended that this invention be limited only by the claims and the equivalents thereof.

What is claimed is:

1. A storage router, comprising:
    a management module having a management interface, wherein the management interface receives commands and wherein the management module configures the storage router as a function of the received commands;
    an IP network interface;
    a SCSI network interface capable of transferring data on a storage network running a SCSI protocol; and
    a SCSI router, wherein the SCSI router includes means for receiving encapsulated SCSI packets from the IP network interface, means for extracting the SCSI packet from the encapsulated SCSI packet and means for forwarding the SCSI packet to the SCSI network interface, and means for executing a discovery process to determine devices connected to the storage network;
    wherein the SCSI router maps physical storage devices to iSCSI targets.

2. The storage router of claim 1, wherein the management module includes a high availability interface.

3. The storage router of claim 1, wherein the management interface receives commands via the IP network interface.

4. The storage router of claim 1, wherein the SCSI network interface includes a Fibre Channel interface.

5. A storage router, comprising:
    a management module having a management interface, wherein the management interface receives commands and wherein the management module configures the storage router as a function of the received commands;
    an IP network interface;
    a SCSI network interface capable of transferring data on a storage network running a SCSI protocol; and
    a plurality of virtual SCSI routers, wherein each virtual SCSI router includes means for receiving encapsulated SCSI packets from the IP network interface, means for extracting the SCSI packet from the encapsulated SCSI packet and means for forwarding the SCSI packet to the SCSI network interface and means for executing a discovery process to determine devices connected to the storage network;
    wherein each virtual SCSI router maps physical storage devices to iSCSI targets.

6. The storage router of claim 5, wherein the SCSI network interface includes an iSCSI interface.

7. The storage router of claim 5, wherein the management module includes a high availability interface.

8. The storage router of claim 5, wherein the management interface receives commands via the IP network interface.

9. The storage router of claim 5, wherein the SCSI network interface includes a parallel SCSI interface.

10. A computer system capable of communicating across an IP network, comprising:
    a computer, wherein the computer includes a network interface capable of transferring data across the IP network; and
    a storage router, wherein the storage router includes:
        a management module having a management interface, wherein the management interface receives commands and wherein the management module configures the storage router as a function of the received commands;
        an IP network interface;
        a SCSI network interface for connecting to a storage network running a SCSI protocol;
        a means for executing a discovery process to determine devices connected to the storage network; and
        a virtual SCSI router, wherein the virtual SCSI router receives encapsulated SCSI packets from the computer via the IP network interface, extracts the SCSI packet from the encapsulated SCSI packet and forwards the SCSI packet to the SCSI network interface;
        wherein the virtual SCSI router maps physical storage devices to iSCSI targets.

11. The computer system of claim 10, wherein the management module includes a high availability interface.

12. The computer system of claim 10, wherein the management interface receives commands via the IP network interface.

13. The computer system of claim 10, wherein the storage router is coupled between a Gigabit Ethernet interface and a Fibre Channel interface and configured to perform as an IPv4 router.

14. A method of accessing data stored on a storage network, comprising:
    inserting an iSCSI driver in the protocol stack of a server;
    generating a SCSI request within the server and passing the SCSI request to the iSCSI driver;

executing instructions in the iSCSI driver to encapsulate the SCSI request in one or more IP packets;

routing the encapsulated SCSI request over an IP network;

receiving the encapsulated SCSI request;

extracting the SCSI request from the one or more IP packets; and routing the SCSI request through a virtual SCSI router to the storage network, wherein routing includes mapping physical storage devices to iSCSI targets.

15. The method of claim 14, wherein routing the SCSI request through a virtual router includes executing a discovery process to determine devices connected to the storage network.

16. The method of claim 14, wherein receiving the encapsulated SCSI request includes verifying that the encapsulated SCSI request was received at a predefined IP network interface.

17. A storage router system having a plurality of storage routers, including two or more managed storage routers, wherein each of the managed storage routers comprises:

a management module having a management interface, wherein the management interface includes a high availability interface, wherein the management module receives commands via the management interface and configures the storage router as a function of the received commands;

an IP network interface;

a SCSI network interface capable of transferring data on a storage network running a SCSI protocol; and a SCSI router, wherein the SCSI router includes means for receiving encapsulated SCSI packets from the IP network interface, means for extracting the SCSI packet from the encapsulated SCSI packet and means for forwarding the SCSI packet to the SCSI network interface and means for executing a discovery process to determine devices connected to the storage network;

wherein the high availability interface of each managed storage router is communicatively connected to the high availability interface of each of the other managed storage routers; and wherein the SCSI router maps physical storage devices to iSCSI targets.

18. The storage router system of claim 17, wherein the management module includes a high availability interface.

19. The storage router system of claim 17, wherein the management interface receives commands via the IP network interface.

20. The storage router system of claim 17, wherein the SCSI network interface includes a Fibre Channel interface.

* * * * *

UNITED STATES PATENT AND TRADEMARK OFFICE
CERTIFICATE OF CORRECTION

PATENT NO. : 7,437,477 B2  
APPLICATION NO. : 11/622436  
DATED : October 14, 2008  
INVENTOR(S) : Kuik et al.

It is certified that error appears in the above-identified patent and that said Letters Patent is hereby corrected as shown below:

In column 1, line 35, delete "N" and insert -- IN --, therefor.

In column 2, line 37, delete "predetermined" and insert -- pre-determined --, therefor.

In column 2, line 40, delete "S SP" and insert -- SSP --, therefor.

In column 18, line 9, delete "($GA_{13}$ NXT)" and insert -- (GA_NXT) --, therefor.

Signed and Sealed this

Twentieth Day of January, 2009

JON W. DUDAS  
*Director of the United States Patent and Trademark Office*